US006639688B2

(12) United States Patent
Imai

(10) Patent No.: US 6,639,688 B2
(45) **Date of Patent: *Oct. 28, 2003**

(54) VALUE-SHEET ISSUING DEVICE FOR SELECTIVELY ASSIGNING COMMON IMAGES FROM A LOCAL STORAGE

(75) Inventor: Eiji Imai, Nagano (JP)

(73) Assignee: Kabushiki Kaisha Sankyo Seiki Seisakusho, Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,221

(22) Filed: Jun. 10, 1999

(65) Prior Publication Data

US 2003/0103228 A1 Jun. 5, 2003

(30) Foreign Application Priority Data

Jun. 10, 1998 (JP) .......................................... 10-162578

(51) Int. Cl.[7] ............................ G06F 3/12; G06F 13/00
(52) U.S. Cl. ...................................... 358/1.14; 358/1.15
(58) Field of Search ............................... 358/1.14, 1.15, 358/1.13, 1.16, 1.9, 501, 537, 538, 401, 402, 403, 404, 449, 450, 452; 399/16, 66, 84; 355/407, 112; 270/39.02, 52.03, 52.13; 271/3.06, 9.05

(56) References Cited

U.S. PATENT DOCUMENTS 4,992,647 A * 2/1991 Konishi et al. ............. 235/379
5,687,087 A * 11/1997 Taggart ................. 364/479.03
6,359,701 B1 * 3/2002 Yamada et al. .............. 358/1.2

FOREIGN PATENT DOCUMENTS

JP 8-263726 10/1969 .......... G07D/13/00

* cited by examiner

*Primary Examiner*—Gabriel Garcia
*Assistant Examiner*—Douglas Tran
(74) *Attorney, Agent, or Firm*—Sughrue Mion, PLLC

(57) ABSTRACT

A value-sheet issuing device includes a medium supplying section for holding a sheet-like printing medium and supplying said printing medium to a stage for issuing a value sheet, a security processing section for selectively assigning security characteristic for preventing attempted fraudulent use of said value sheets to said printing medium received from said medium supplying section in response to an instruction received from an upper level device, local storage for storing common images used common to issued value sheets, a printer section for printing said common image read out of said local storage means and/or individual information received from said upper level device, said individual information different for each said issued value sheet; and a print verifying section for verifying a print quality of said printed printing medium.

15 Claims, 16 Drawing Sheets

VALUE-SHEET ISSUING DEVICE FOR SELECTIVELY ASSIGNING COMMON IMAGES FROM A LOCAL STORAGE

BACKGROUND OF INVENTION

1. Field of the Invention

The present invention relates to a value-sheet issuing device for issuing sheets having the value of money, such as coupons or tickets.

2. Related Art

A value-sheet issuing device for issuing value sheets, such as coupons or tickets are known. The value-sheet issuing device is assembled into a machine, called a self-service terminal. The value-sheet issuing device prints required information on a sheet-like printing medium in color to form a value sheet. A customer gets the value sheet from the self-service terminal. The "self-service terminal" is an ATM (Automatic Teller Machine), an information terminal or the like. The "value sheet" is a sheet having the value of money. There are various types of value sheets, such as coupons (low value sheets) distributed widely among customers at free at the self-service terminal, and tickets (high value sheets) bought by customers. Examples of the low value sheets are discount tickets, exchange tickets, and receipts with advertisements printed thereon, and examples of the high value sheets are gift certificates and admission tickets.

The ATM having the function of issuing tickets as the value sheets is disclosed in Unexamined Japanese Patent Publication Hei. 8-263726. A ticket issuing device of the ATM is made up of a ticket supplying section for supplying tickets sheet by sheet, a printer section for printing images and other information on a ticket in color, and a print quality verifying section for verifying the print quality of the ticket, viz., if it is satisfactory. The ticket issuing device receives an instruction from an upper level computer, e.g., a host computer or a control device, and issues different kinds of tickets sheet by sheet.

The printer section prints a common image and individual information on a ticket in color. The common image is common to all the tickets of the same kind to be issued. The individual information is different for each ticket. The ticket issuing device receives the common image and the individual information from the upper level computer. The currency of forged tickets will be prevented by printing the image in color at high definition.

The value-sheet issuing device must receive the common image and the individual information from the upper level computer every time it issues a value-sheet. The data amount of the common image is great since it is a color image. The result is that much time is taken for the data transfer of the common image, and hence for issuing the value-sheets.

To secure security at high level, the ticket issuing device prints the high and low value tickets at uniform and high resolutions. Further, the print quality verifying section carries out a careful and precise verifying operation for the tickets printed. Therefore, the ticket issuing device takes a long time to issue cheap ticket requiring no security. Thus, the ticket issuing time of the ticket issuing device is long. Accordingly, when many customers queue up at an ATM, the customers who handles the ATM for a relative short time must wait for a long time.

To cope with this, JP-A-8-263726 proposes a device which preferentially performs a normal ATM function when many customers are in queue, while limiting the ticket issuing function. Thus, when many customers are in queue, the ticket issuing function is limited, and this is very inconvenient for the customers who want to get the tickets in such a situation.

SUMMARY OF INVENTION

Accordingly, an object of the present invention is to provide a value-sheet issuing device which issues value sheets for a short time in response to customer's requests without limiting the value-sheet issuing function, viz., succeeds in reduction of the value-sheet issuing time.

An aspect of the present invention, there is provided a value-sheet issuing device comprising: a medium supplying section for holding a sheet-like printing medium and supplying said printing medium to a stage for issuing a value sheet;

- a security processing section for selectively assigning security characteristic for preventing attempted fraudulent use of said value sheets to said printing medium received from said medium supplying section in response to an instruction received from an upper level device;
- local storage for storing common images used common to issued value sheets;
- a printer section for printing said common image read out of said local storage means and/or individual information received from said upper level device, said individual information being different for each said issued value sheet; and
- a print verifying section for verifying a print quality of said printed printing medium.

As seen from the foregoing description, a value-sheet issuing device constructed according to the present invention stores common images in a local memory before a printed printing media is issued, and when its issuance is required, reads a required common image out of the local memory and prints an incoming printing media. Therefore, there is no need of receiving the common image from the upper level device every time the value sheet is issued. This leads to reduction of data transfer time.

BRIEF DESCRIPTION OF DRAWINGS

FIG. 11A is a plan view showing a portion including IJP printheads, and FIG. 11*b* is a side view showing the same;

DETAILED DESCRIPTION OF PREFERRED EMBODIMENTS

Figure 1:
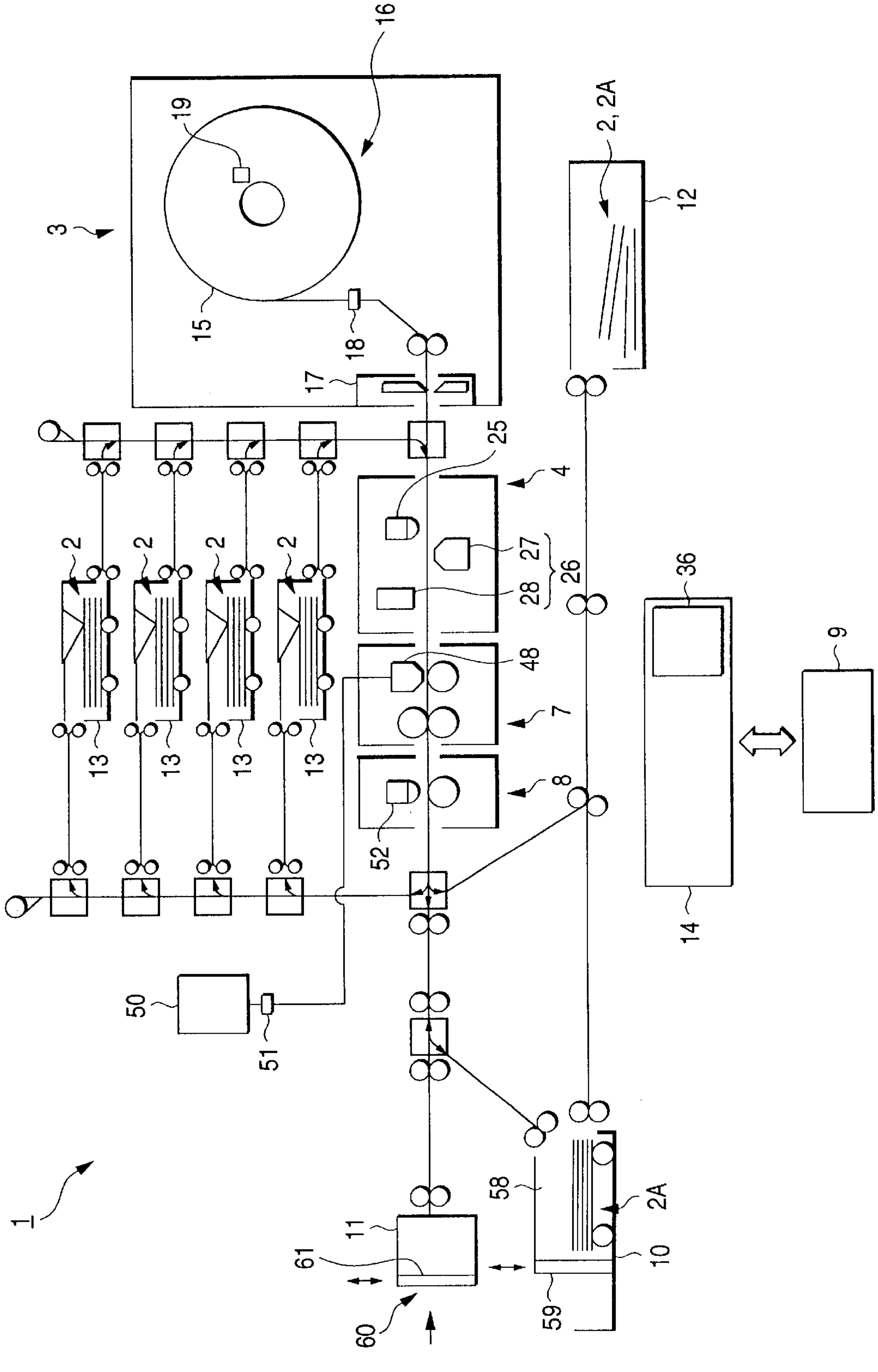
FIG. 1 is a diagram, in block and schematic form, showing an overall construction of a value-sheet issuing device constructed according to the present invention.

The preferred embodiment of the present invention will be described with reference to the accompanying drawings. A hardware construction of a value-sheet issuing device constructed according to the present invention will first be described with reference to FIGS. 1 through 20. The value-sheet issuing device designated by reference numeral 1 is designed so as to be assembled as a unit into a self-service terminal for issuing coupons and tickets. Sheet-like printing media made of cloth and plastic as well as paper can be handled by the value-sheet issuing device 1.

The value-sheet issuing device 1 includes a medium supplying section 3, a security processing section 4, a printer section 7, and a print verifying section 8. The medium supplying section 3 supplies sheet-like printing media 2 sheet by sheet to a machine body of the issuing device. The security processing section 4 applies a "security characteristic" to a sheet-like printing medium 2 delivered from the medium supplying section 3. The "security characteristic" is used for securing a security against an attempted fraudulent use of the value sheets as will be described later. The printer section 7 prints a common image 5 and individual information 6 on a sheet-like printing medium 2.

The print verifying section 8 verifies the print quality of the value sheet, viz., if it is satisfactory. The value-sheet issuing device 1 issues value sheets 2A sheet by sheet in response to an instruction received from an upper level device 9 connected to the issuing device. Security of a low value sheet can be secured merely by printing a simple individual information 6 on a sheet-like printing medium supplied; there is no need of applying a special security characteristic to the incoming sheet-like printing medium.

The "security characteristic" is applied to a value sheet to be issued and shows if the value sheet is authentic or valid. The "security characteristic" may take various forms, for example, a mark, a pattern, image data, numerical data, magnetic data or the like. A simple security characteristic may be used for low value sheets, while complicated security characteristic may be used for high value sheets.

The value-sheet issuing device 1 further includes a discharging portion 10, a first collector box 11, a second collector box 12, a stacker portion 13, and a control unit 14. The discharging portion 10 receives value sheets 2A from the print verifying section 8 and discharges them outside. The first collector box 11 collects issued value sheets 2A, not yet used, returned by customers. The second collector box 12 collects defective value sheets 2A, for example, value sheets having undergone abnormality during its issuing operation, and the value sheets collected by the first collector box 11. The stacker portion 13 is stocked with value sheets 2A bearing common images 5 thereon. Those value sheets 2A are sorted every kind of the common image 5 in the stacker portion 13. The control unit 14, connected to the upper level device 9, controls the operations of the related sections and portions. The first collector box 11, the second collector box 12 and the stacker portion 13 are not essential to the value-sheet issuing device 1.

Figure 2:
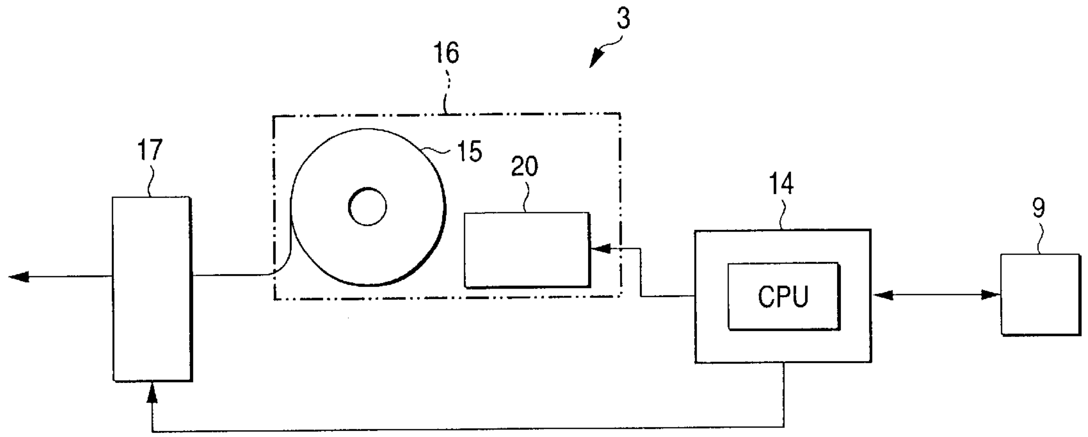
FIG. 2 is a block diagram showing a medium supplying section and its control system.

The medium supplying section 3 holds sheet-like printing medium or media 2 so as to issue value sheets 2A, and supplies them sheet by sheet for issuing value sheets. As shown in FIGS. 1 and 2, the medium supplying section 3 includes a roll paper holder 16 and a cutter 17. The roll paper holder 16 holds a roll paper 15 and unrolls the rolled paper to feed it forward. The cutter 17 cuts the paper unrolled in a required length and feeds the cut papers forward sheet by sheet. The roll paper 15, set to the medium supplying section 3, may be substituted by a folded paper, for example, a fan fold paper, or normal cut sheets of paper stacked. Different types of papers, for example, a roll paper 15 and a fan fold paper, may be set in the roll paper holder. In this case, a selector is used for selecting either of the papers. In FIG. 1, reference numeral 18 is an end sensor for sensing the end of the roll paper 15, and 19 is a near-end sensor 19 for sensing the near-end of the roll paper 15.

In operation, the control unit 14 issues an instruction of supplying a printing sheet; a motor driver 20 of the roll paper holder 16 responds to the instruction to operate and to pull out a roll paper 15 from the roll paper holder 16; and the cutter 17 cuts the paper to a proper length into a printing sheet of a required size, and feeds it forward.

The roll paper 15 may be plain or have a print of a mark or a pattern, which identifies the roll paper per se (the print gives a security characteristic to the paper). At this time, a mark or pattern, which gives the value of money to the printing sheet, is not yet printed on the printing sheet. Thus, the value-sheet issuing device 1 prints necessary information including image on a printing medium 2, or the printing sheet, into such a value sheet as a coupon or a ticket. The value-sheet issuing device 1 is superior to the value-sheet issuing device of the type in which value sheets 2A having common images 5 and the individual information 6 printed thereon in advance are stocked in the following points: 1) Various types of value sheets 2A are issued, and 2) if the printing sheets are stolen away, those are not complete and attempt to fraudulently use them absolutely fails.

Figure 7:
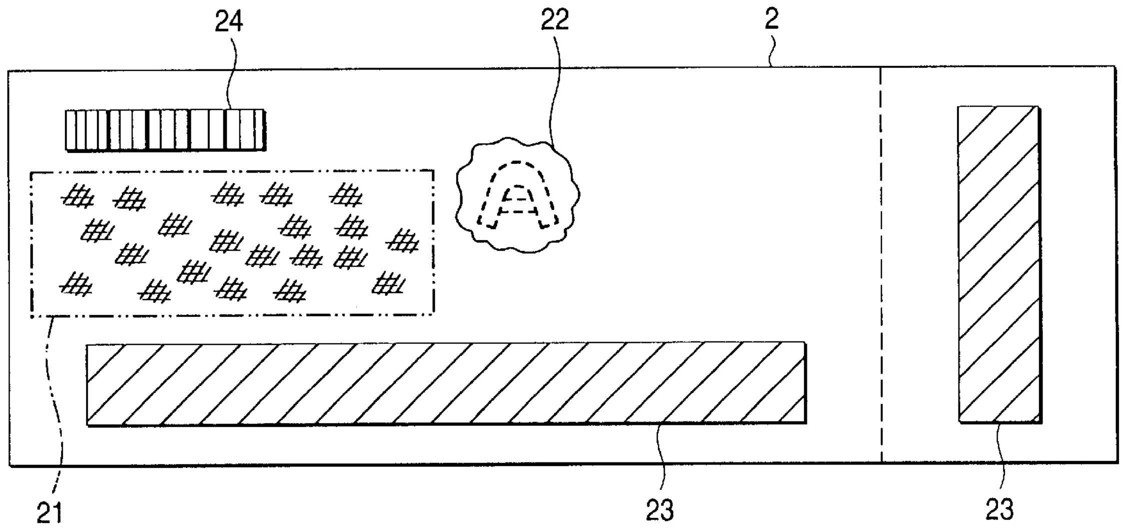
FIG. 7 is a diagram showing yet another example of a value sheet issued by the value-sheet issuing device.

The "security characteristic" may take various forms. To prevent the fraudulent use of the value sheets issued, and to show if the value sheet is authentic, random patterns 21 of light color and a watermark 22, which are difficult to copy, are preferable as shown in FIG. 7. Other preferable security characteristics are micro characters, special colors, concealed characters, patterns difficult to form and the like. Additional security characteristics are a magnetic stripe 23 attached to the printing sheet, a bar code 24 printed on the printing sheet and others (FIG. 7).

The security processing section 4 selectively applies the security characteristic to incoming printing sheets delivered from the medium supplying section 3. It includes an attribute detector 25 for detecting attribute information for security attached in advance to the printing sheet, and a security applying means 26. The security applying means 26 may apply the attribute information (detected by the attribute detector 25) as security characteristic to the printing sheet or another security characteristic to the same. The attribute detector 25 and the security applying means 26 may selectively be operated. The thus constructed security processing section 4 is capable of selectively performing the security applying operations. Specifically, when the attribute detector 25 is selected, the security processing section 4 applies the security attribute information (detected by the attribute detector 25) as attribute information to the printing sheet. When the attribute detector 25 is not selected, the security processing section 4 applies another security characteristic to the printing sheet. Further, when the attribute detector 25 is selected, the security processing section 4 applies the security attribute information by the attribute detector 25 and another security characteristic as the attribute information, as the attribute information, to the printing sheet. Therefore, the security processing section 4 is able to change a level (security level) of the complexity of the security characteristic in accordance with a level (=value level) of the value of money assigned to the value sheet 2A. In other words, where the value-sheet issuing device 1 is used, an excessively high security level is not assigned to the value sheet. Accordingly, a value-sheet issuing time of the value-sheet issuing device is reduced.

The attribute detector 25 includes a sensor for reading a random attribute. The sensor may be a photo sensor. When the security attribute information attached in advance to the printing sheet is image information, for example, a random linear image pattern is depicted at a specific position on the printing sheet, the attribute detector 25 reads the image pattern and detects it as information proper to the printing sheet, or random attribute information. The random attribute information is then converted into a code, and the printer section 7 prints the code in the form of a numeral or a bar code 24 as individual information 6 on the printing sheet. Alternatively, the security applying means 26 writes the code as data into the magnetic stripe 23 of the printing sheet. With this, the value-sheet issuing device 1 can compare the data representative of the random attribute information proper to the printing sheet with the information assigned later on to the printing sheet, whereby a security characteristic to show if the issued value sheet is authentic is secured.

The security applying means 26 includes a magnetic head 27 and a logo stamp 28. The magnetic head 27 writes information into a magnetic stripe 23, if it is attached to the printing sheet. Accordingly, the random attribute information of the printing sheet detected by the attribute detector 25 and another security information can be written into the magnetic stripe 23 of the printing sheet. The logo stamp 28 stamps a logo 29, e.g., a mark, on the printing sheet. Special ink for anti-forgery, e.g., ink responsive to only ultraviolet rays, or a color print, which is visually recognizable, is preferably used for the stamping.

Figure 3:
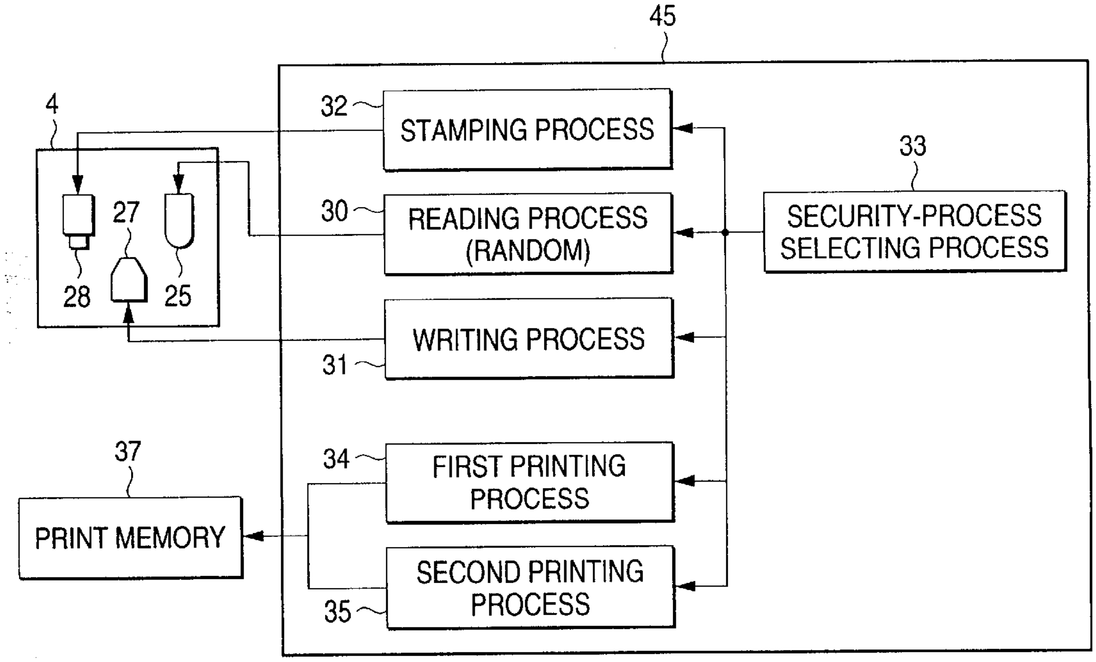
FIG. 3 is a block diagram showing useful in explaining a security-level selecting operation by a security processing section.

Selection of the security level of the security characteristic will be described with reference to FIG. 3. In the security-level selecting operation, a security-process selecting process 33 selects one of a reading process 30 for reading random attribute information, a writing process 31 for writing random attribute information in the form of magnetic information, and a stamping process 32 for stamping a logo 29. A first printing process 34 for encrypting data of the random attribute information read by the reading process 30 into a bar code and a second printing process 35 for printing the security characteristic in the form of a character or numeral are selectively carried out. Thus, the security-process selecting process 33 selects one or all of those processes and executes the selected one. Accordingly, a security level of the security characteristic is selected so as to match a value level of a value sheet to be issued, and such as security characteristic is assigned to the latter. Therefore, a value-sheet issuing time of the value-sheet issuing device is reduced, and the issuing device may be economically operated. The lowest security level of the security characteristic may be realized by a color printing of the printing sheet.

In the present embodiment, the security processing section 4 is constructed with the attribute detector 25 and the security applying means 26, viz., the magnetic head 27 and the logo stamp 28. The thus constructed security processing section 4 is capable of selecting one of a plurality of security processes. The security processing section 4 may also be realized with a mechanism to form a specific combination of protrusions and recesses on the printing sheet and/or in a manner that the logo 29, the bar code 24 and other security information are printed by use of the printer section 7. Various ways of assigning the security characteristic and/or characteristics to the printing sheet may be selectively used.

Figure 4:
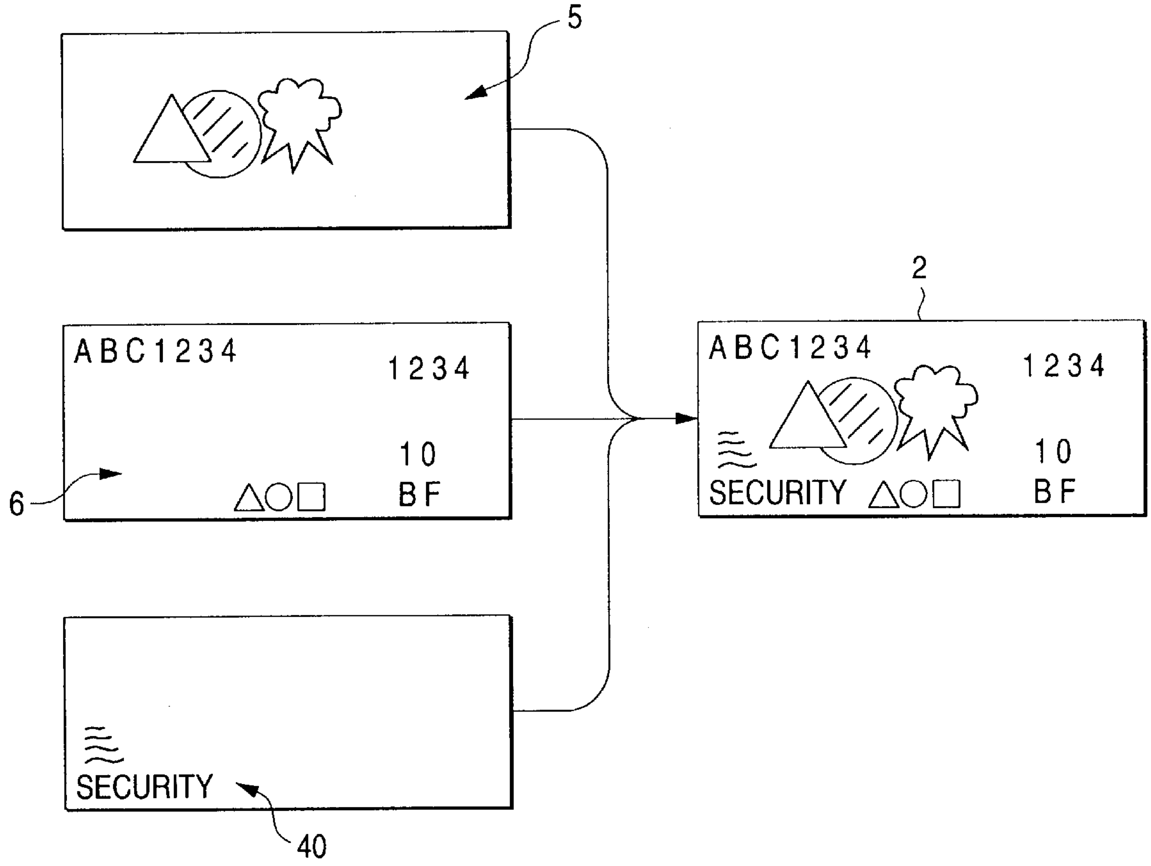
FIG. 4 is a diagram showing kinds of print information printed on a sheet-like printing medium, which is used by the value-sheet issuing device.
Figure 5:
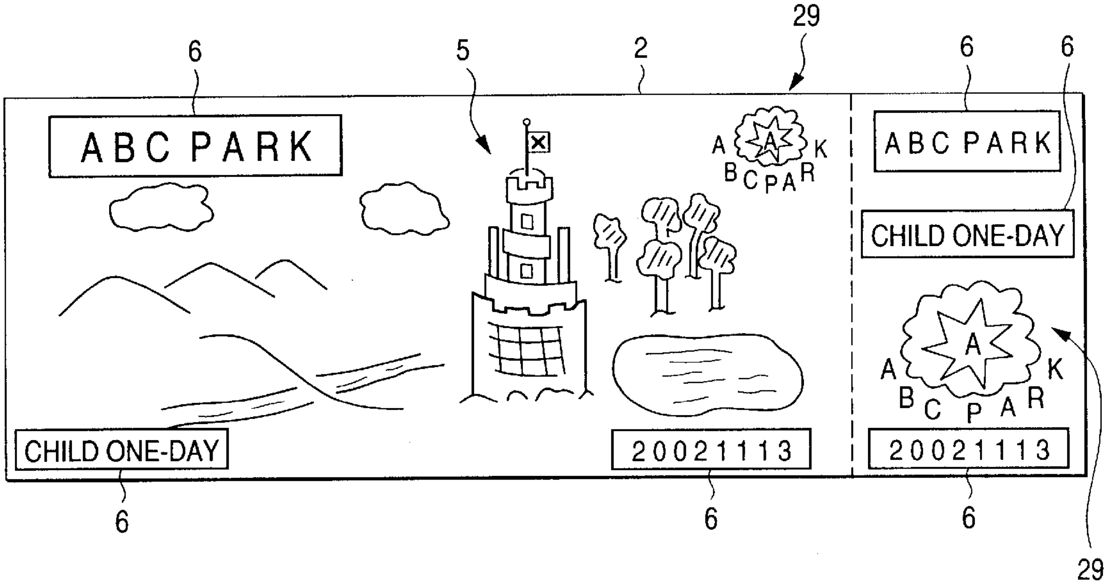
FIG. 5 is a diagram showing an example of a value sheet issued by the value-sheet issuing device.
Figure 6:
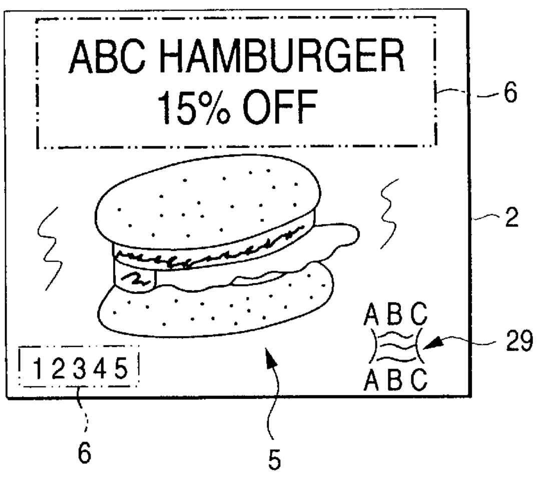
FIG. 6 is a diagram showing another example of a value sheet issued by the value-sheet issuing device.

The printer section 7 prints an common image 5 used common to all printing sheets of the same kind and individual information 6 different for each printing sheet on a printing sheet supplied from the medium supplying section 3. As shown in FIGS. 4 through 6, the common image 5 is a background image common to all the value sheets of the same kind to be issued, and is generally printed in color. The individual information 6 is a numeral, a bar code or a mark, which is representative of characters of the name, which is different for each value sheet.

Figure 20:
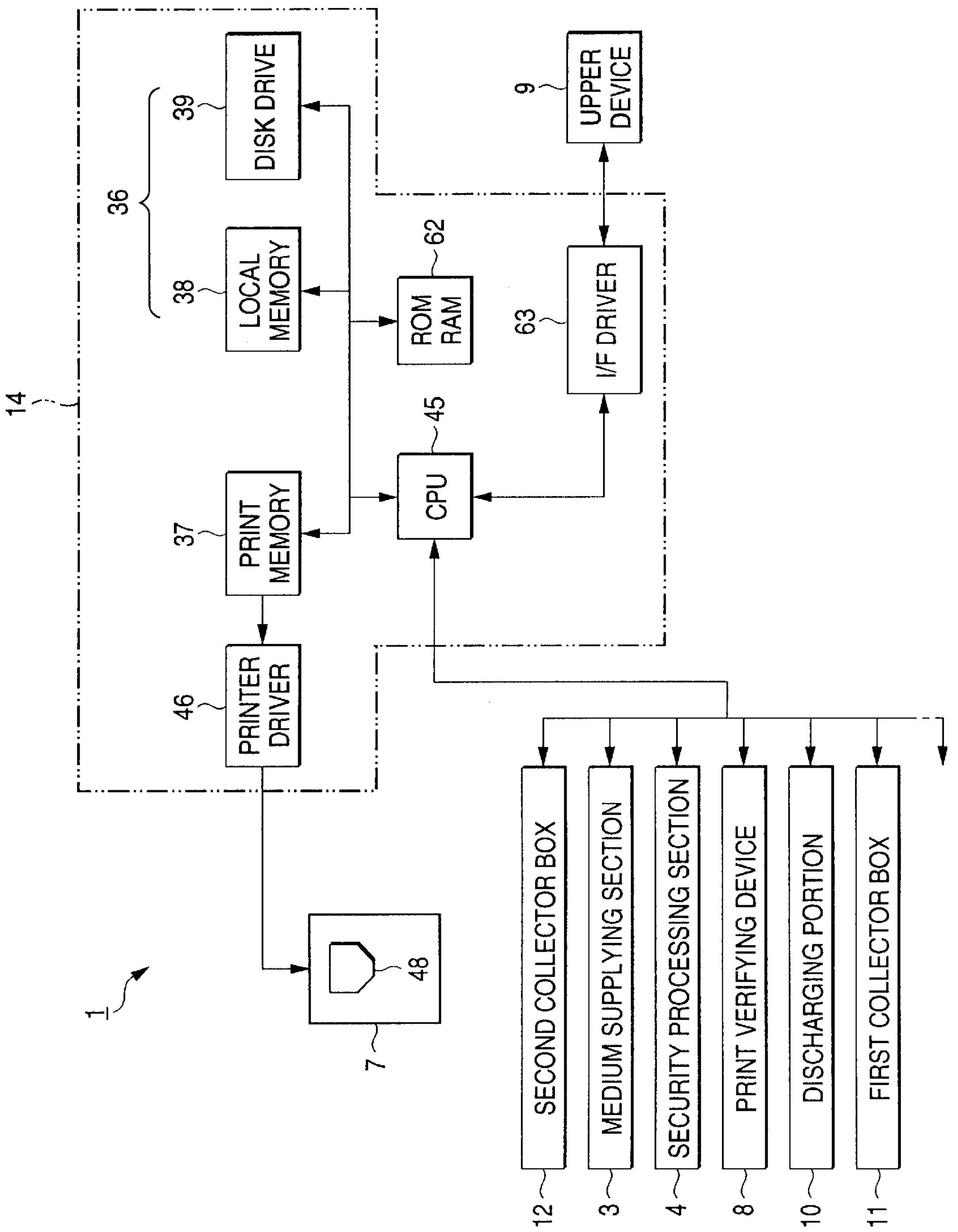
FIG. 20 is a block diagram showing a control unit of the value-sheet issuing device.

The value-sheet issuing device 1 includes a local memory 36 for storing the common image 5. The local memory 36 may be a semiconductor memory 38, e.g., RAM, a hard disc, a disc drive 39, or such an exchangeable data storage as FD or CD-ROM (FIG. 20). The value-sheet issuing device receives common image 5 from the upper level device 9 and stores it into the local memory 36 before issuing value sheets 2A (dotted lines in FIG. 8). The data storing operation is performed by receiving all the data from the upper level device 9 at the time of power on, initializing, or changing the kind of value sheets to another kind of value sheets. When the value sheets are issued, the control unit 14 judges as to whether or not the individual information 6 to be printed is stored in the local memory 36. When it is stored, the control unit 14 reads out the common image 5 from the local memory 36, and stored it to a print memory 37, and causes the printer section 7 to print the common image on a printing sheet. Therefore, there is no need of receiving a large amount of data, or the common image 5, from the upper level device 9 every time the value sheet is issued. This leads to reduction of data transfer time, and hence, reduction of the value-sheet issuing time.

The local memory 36 preferably includes a plurality of memory areas for storing a plurality of common images 5. If the local memory 36 can store ten common images 5, the value-sheet issuing device issues ten different value sheets by the utilization of the local memory.

Figure 8:
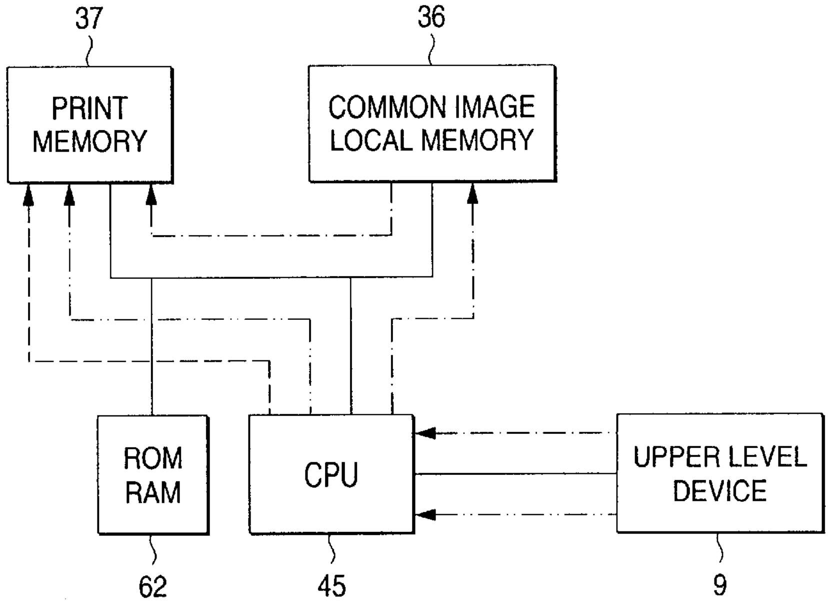
FIG. 8 is a block diagram useful in explaining transfer paths of various print information in the value-sheet issuing device.

The individual information 6 is received from the upper level device 9 and directly transferred to the print memory 37 (dotted lines in FIG. 8). The individual information 6 is different every value sheet, and inmost cases, it consists of characters and symbols Even if it consists of an image, its image is a small mark or a small pattern. Therefore, the data amount of the individual information is much smaller than that of the common image 5. For this reason, if the individual information 6 is received every time a value sheet is issued, the time for data reception is negligible. In the embodiment of the invention, the type of the information to be printed, the common image or the individual information, is determined depending on whether or not it is different for each value sheet. Accordingly, the information which is common to all the value sheets is treated as the common image. The information that is common to all the value sheets may be treated as the individual information if its information amount is small and its reception from the upper level device 9 does not take much time.

The printer section 7 also prints device information 40 (FIG. 4). The device information 40 is security information to be encrypted by the issuing device per se independently of the upper level device 9 (dotted lines in FIG. 8). And the device information 40 is assigned as designation to each device. A specific example of the device information is the unit number of the value-sheet issuing device 1. The device information is used for specifying the value-sheet issuing device 1 which has printed for the security characteristic.

Figure 9:
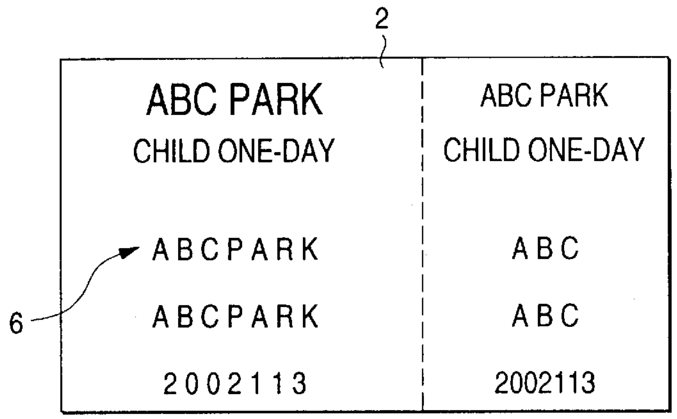
FIG. 9 is a diagram showing still another example of a value sheet issued by the value-sheet issuing device.

To change a printing status, a print level of the printer section 7 may be remotely selected from the upper level device 9. Accordingly, a print level can be changed in accordance with the value level of the value sheet 2A to be issued. In other words, a print level can be selected which is matched to a value level of a value sheet 2A to be issued. Therefore, there is less chance of using a print level being mismatched to a value level of a value sheet 2A to be issued. In the example of the value sheet of FIG. 4, the common image 5, the individual information 6 and the device information 40 are printed on a sheet-like printing medium 2 by the printer section 7. Another example of the value sheet is shown in FIG. 9. In this example, only individual information 6 is printed on a sheet-like printing medium 2. With the print of the individual information, the printing medium 2 has the minimum value of the value sheet. In this case, the printing time for the common image 5 and the device information 40 is not present, leading to reduction of the value-sheet issuing time.

An example of changing the print level is that the printing of an admission ticket at 600 dpi is changed to the printing of a coupon at 300 dpi. If required, a printing area of the common image 5 is limited to only the necessary portion (portion necessary for recognizing a value sheet) or the common image 5 may consist of only text data. Specifically, a text data substituted for the common image 5 is defined in advance, and a value sheet after issued contains only the text data. In this case, the value sheet will lose its security characteristic if a color print is used. To avoid this, a security characteristic is preferably added to the sheet. To this end, a bar code, for example, is printed on the sheet.

Figure 10:
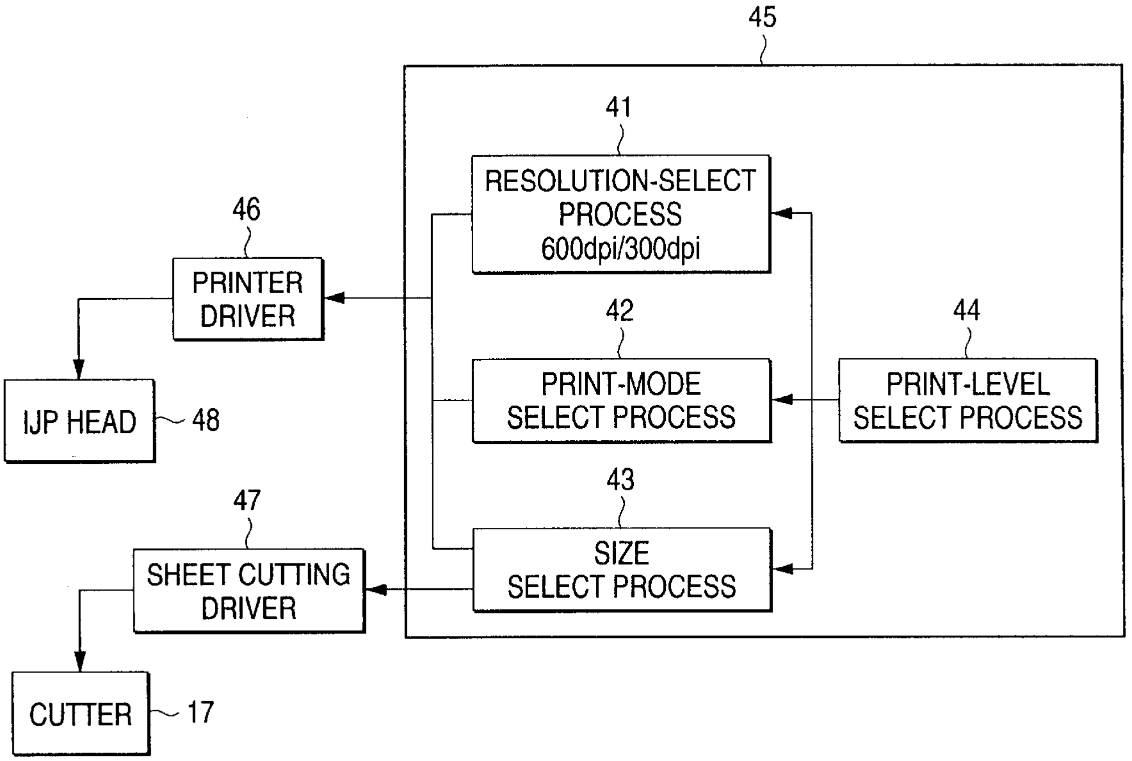
FIG. 10 is a block diagram useful in explaining a print-level selecting operation by a printer section of the value-sheet issuing device.

Means of selecting the print level may be implemented as shown in FIG. 10. As shown, the print level may be selected by use of a resolution-select process 41, a print-mode select process 42 and a size select process 43. The resolution-select process 41 selects one of resolutions of 600 dpi and 300 dpi. The print-mode select process 42 selects one of an image mode for printing image data including the common image 5 and a text mode for printing text data containing only the individual information 6. The size select process 43 selects one of a full size of the value sheet and an economy (small) size of the same. An intended process of those processes is selected by a command issued from a print-level select process 44 contained in the upper level device 9. The value-sheet issuing device 1 receives the command from the upper level device 9 and processes the commanded process in a software domain. When the resolution or the print mode is changed to another, the print-level change is transferred to a print driver 46 which in turn drives the printer by printer drive information containing the change. When the print size is changed to another, the print-size change is transferred to a sheet-cutting driver 47 which in turn cuts a continuous printing sheet to a given sheet size.

The printer section 7 of the embodiment is designed so as to capable of printing the common image 5, the individual information 6 and the device information 40. The printing capability of printing at least the common image 5 and the individual information 6 suffices.

Figure 11:
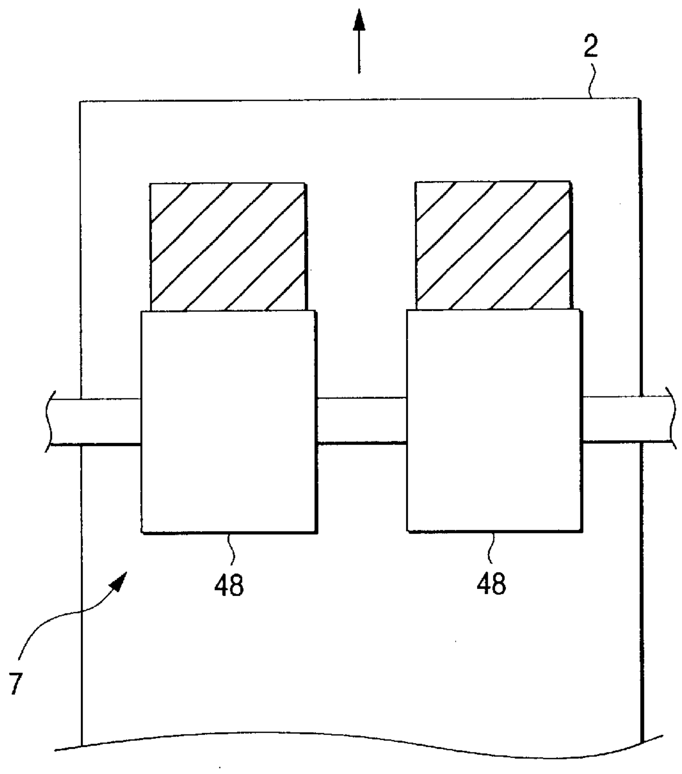
FIG. 11 is a diagram showing how the printer section prints.
Figure 11:
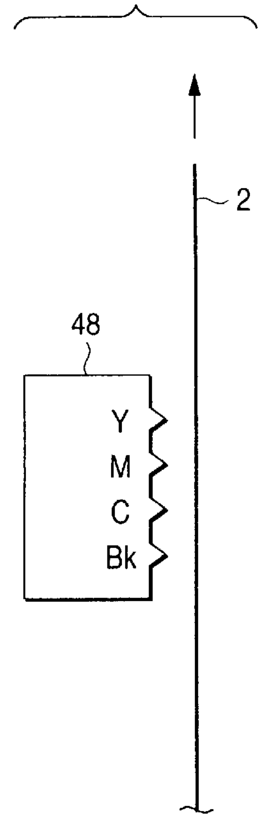
Figure 12:
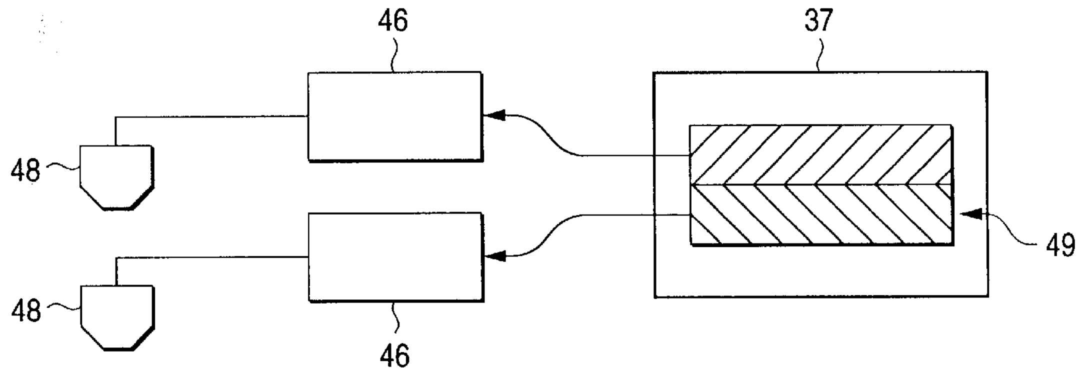
FIG. 12 is a diagram showing a connection of the IJP printheads in FIG. 11 to a print memory.

As shown in FIG. 11, in the printer section 7 a printhead portion 48 consists of a plurality of printheads 48. Those printheads are concurrently moved to print on a sheet-like printing medium 2. With use of the plurality of printheads, a printing speed is higher than that of the conventional printer using a single printhead. Therefore, the value-sheet issuing time is reduced.

In the embodiment, as shown in FIG. 11, the printhead portion 48 includes two ink jet printer (IJP) heads 48 arrayed side by side. Each printhead is capable of printing in four colors of yellow, magenta, cyan and black. A known or inventive printhead may be used for the printhead 48. The IJP printheads 48 are movable in the width direction of the print, or the horizontal scan direction.

In operation, the upper level device 9 issues a print command to the value-sheet issuing device 1; the value-sheet issuing device 1 reads out the common image 5 from the local memory 36; it receives the individual information 6 from the upper level device 9; it prepares the device information 40 assigned thereto; it composes those information into a single image data (FIG. 4); and it stores into the print memory 37. To print image information 49 (stored in the print memory 37) by use of the two IJP printheads 48, the image information 49 is halved for each area (FIG. 12), and the halved information are transferred to the print driver 46, respectively.

Figure 13:
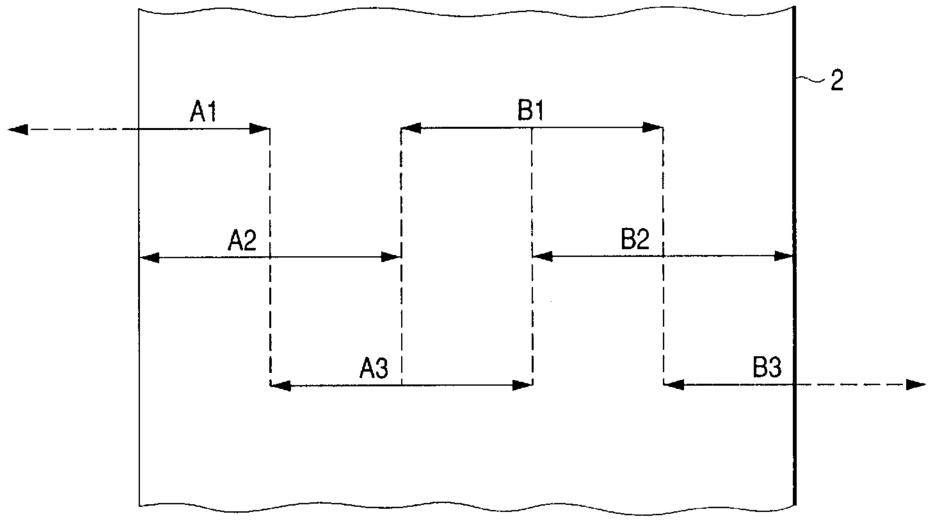
FIG. 13 is a plan view showing a printing method used by the printer section.

The IJP printheads 48 concurrently print as shown in FIG. 13. In printing, the IJP printheads 48 are moved horizontally with respect to the printing medium 2 in a state that those printheads 48 are spaced from each other by a distance corresponding to the half of the full print width. If required, the printing medium 2 may be moved vertically with respect to the IJP printheads 48 in the same state. The IJP printheads 48 linearly print specific print regions (A1, B1) of a print line on the printing medium 2, through the movement of the IJP printheads 48 relative to the printing medium 2. When the moving printheads 48 reach the end point of the print path, the printheads 48 are somewhat shifted vertically with respect to the printing medium 2, and moved back to the start point of the print path to print the next print regions (A2, B2) of the next print line. The first printhead 48 prints one half of the first print line, while the second printhead 48 prints the second half thereof. To this end, the final print region (A3) by the first printhead 48 overlaps with the first print region (B1) by the second printhead 48 when viewed in the vertical directions in FIG. 13. Non-print regions (indicated by dotted lines) by the printheads 48 may be formed on both sides of the full print width. In this case, a print density of each print line is preferably equal to the half of a target print density, and the print regions of a print line printed when the IJP printheads 48 are moved on and along a print path (e.g., forward print path) overlap with the print regions printed when the printheads are moved backward on and along the next print path (e.g., backward print path). By so doing, the IJP printheads 48 doubly print over the entire length of the print line, so that the resultant print quality is higher than that obtained when the printheads print simply. The double printing may also be used for changing the print level.

Figure 14:
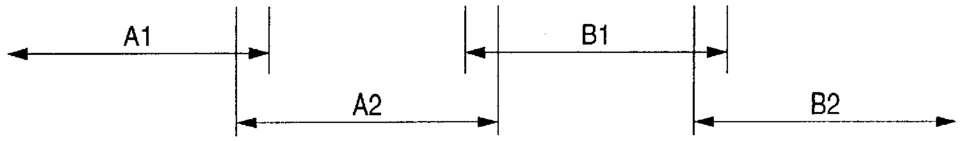
FIG. 14 is a plan view showing another printing method used by the printer section.

In the above instance, the double printing is applied to the printing of the entire print area. In an alternative, the print regions (A1, B1) of a first print line, which are printed through the forward horizontal scan of the printheads, overlap with the print regions (A2, B2) of a second print line, which are printed through the backward horizonal scan as shown in FIG. 14. In this case, a density in the overlapping print regions is reduced so that the resultant print density is substantially equal to that in the non-overlapping print regions. In the alternative printing method, the printing speed is higher than that in the printing method using a single printhead. Reduction of the time for issuing the value sheet 2A results.

As described above, the value-sheet issuing device 1 is arranged so as to be capable of changing a print level in accordance with the kind of value sheet to be issued. Therefore, the length of the overlapping print regions is preferably variable. In FIG. 1, reference numeral 50 is an ink tank 50 for supplying ink to the IJP printheads 48, and 51 is an end sensor 51 for sensing an ink end.

The print verifying section 8 (FIG. 1) checks if the print quality of the value sheet emanating from the printer section 7 is satisfactory. The print verifying section 8 is provided for eliminating the issuance of defective value sheets, for example, the value sheet bearing no print or illegible print, which will result from trouble of the IJP printheads 48, abnormal printhead drive, abnormal transportation of the printing medium 2, abnormal ink end sensing and others. The print verifying section 8 includes a plurality of verifying means 52 of different verifying levels. Those verifying means 52 are selectively used. Specific examples of the verifying means 52 are a photo sensor 53 for sensing a print state on the value sheet 2A and an image scanner 54 as shown in FIG. 5. A select process 64 selects the photo sensor 53 or the image scanner 54.

Figure 15:
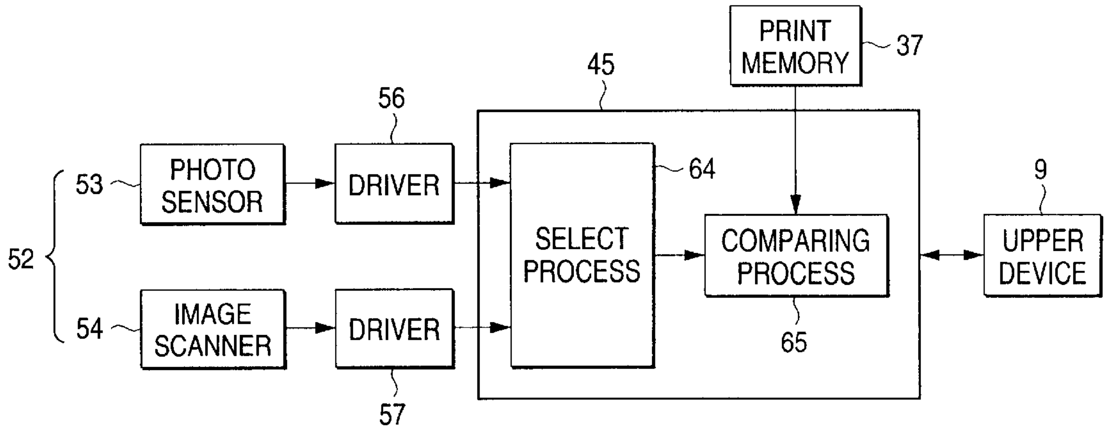
FIG. 15 is a block diagram showing a verifying operation by the print verifying section.
Figure 16:
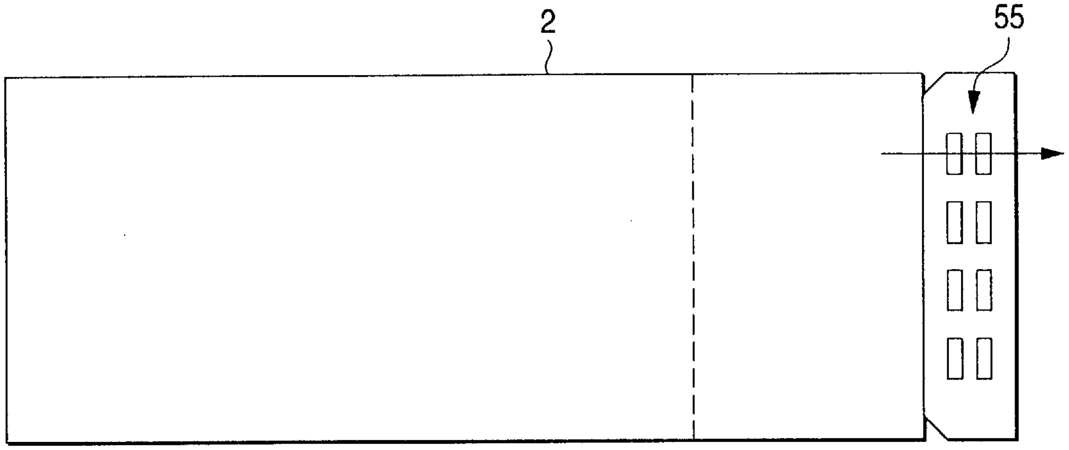
FIG. 16 is a diagram showing a sheet-like printing medium with print verification marks.
Figure 17:
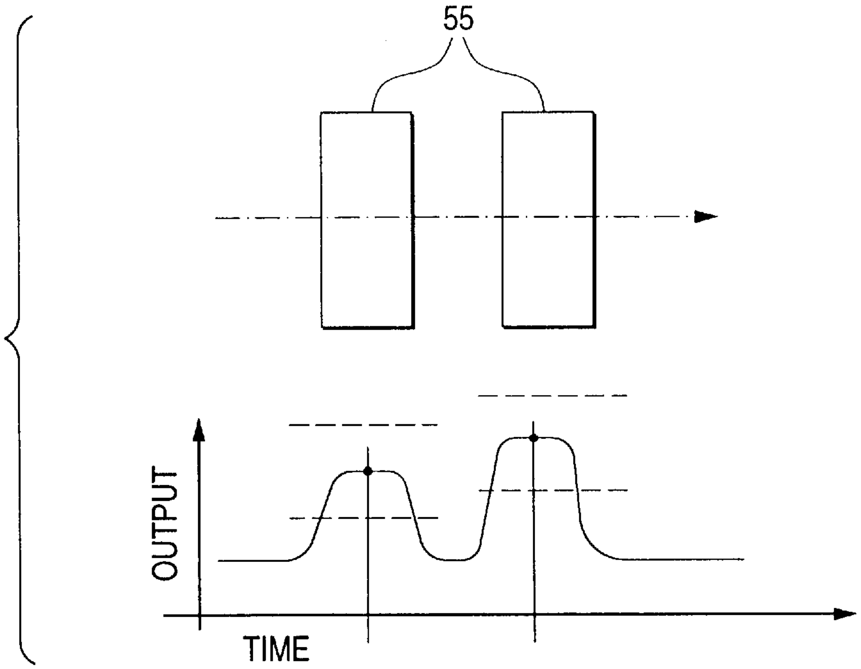
FIG. 17 is a diagram showing print verification marks and a variation of an output signal produced by a sensor when it senses the marks.

Check marks 55 of four colors of yellow, magenta, cyan and black, which are used for color printing, are printed on a part of a printing medium 2 to check the print quality of the value sheet (FIG. 16). The photo sensor 53 senses light reflected from those check marks 55 and produces an electrical signal. The signal is sent to a driver 56 and then to a CPU 45. The CPU compares a signal level with a slice level indicated by a dotted line, and judges if ink of the sensed color is properly transferred onto the sheet by printing (FIGS. 15 and 17). In another print quality verifying method, the sensor linearly scans a value sheet 2A over its entire length (FIG. 19), and sends its output signal to the driver 56 and the CPU 45. To print quality verification, a comparing process 65 compares a characteristic portion (to which a window indicated by a broken line is set) of a readout pattern is compared with the image data in the print memory 37. The print quality verifying method can verify the print quality for a short time since data amount of the data to be compared is small. This leads to reduction of the value-sheet issuing time. Precise comparison of a part or the whole of the read pattern will improve the print-quality verifying accuracy.

Figure 18:
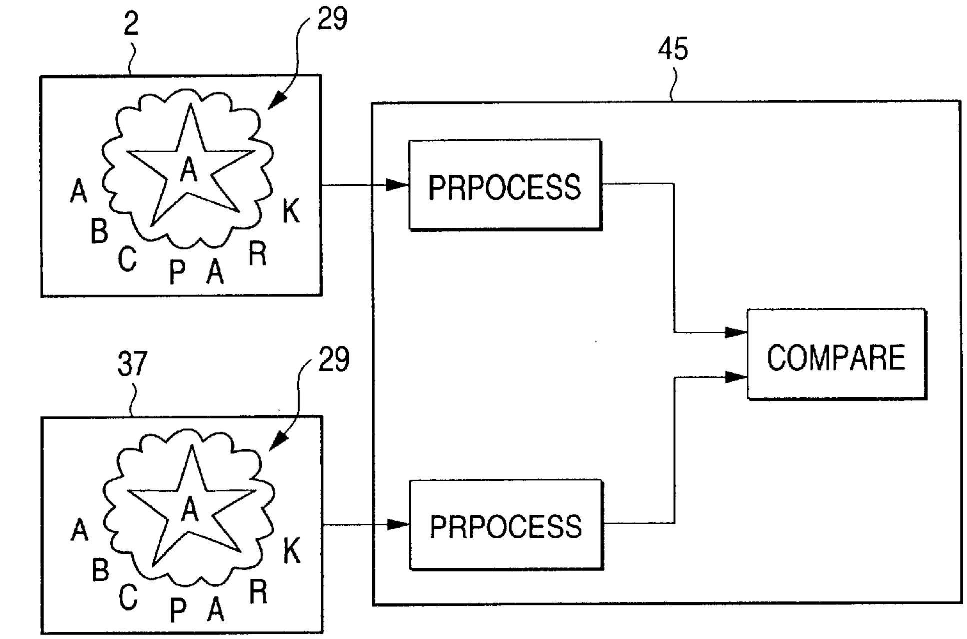
FIG. 18 is a block diagram for explaining a log comparison for the print verification.
Figure 19:
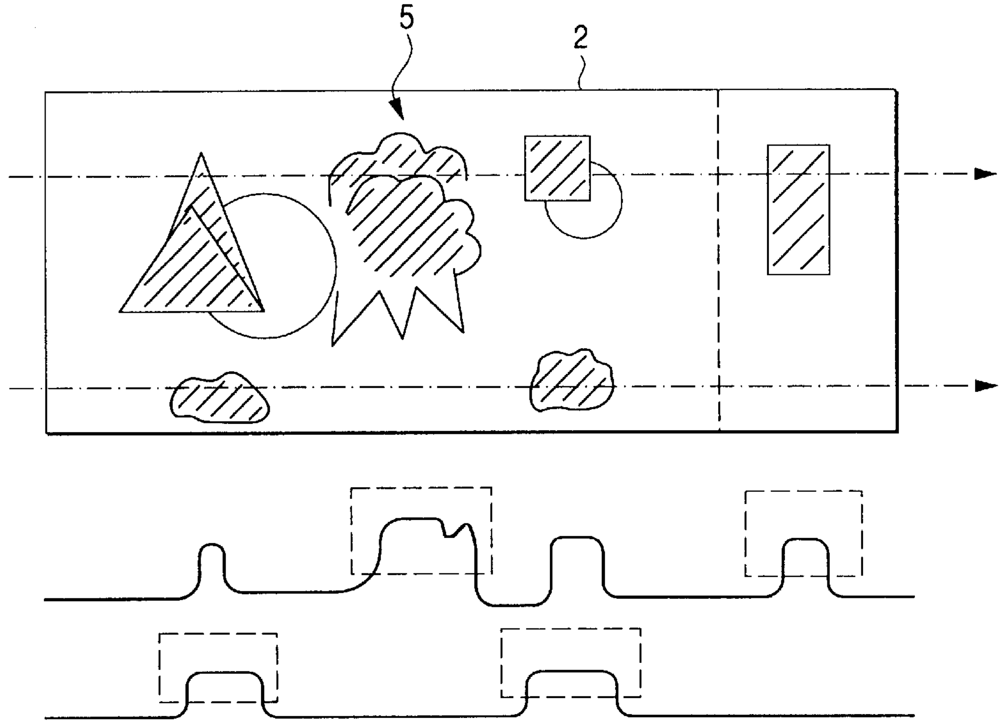
FIG. 19 is a diagram showing a variation of an output signal produced when a common image is read for the print verification.

The print-quality verifying by use of the image scanner 54 will be described with reference to FIG. 18. The image scanner 54 reads a logo 29, for example, on the value sheet 2A, and outputs an image signal to a driver 57 and to the CPU 45. The CPU compares the image signal with the image data of the logo 29, stored in the print memory 37. The comparing levels correspond in number to kinds of value sheets 2A to be issued. Where a short issuing time is desired, the print-quality verifying is made about only the logo 29 (FIG. 18). Where an accurate verifying is required, a part of the print area or the whole print area is read and careful comparison is made of them.

As described above, in the print verifying section 8, the verifying means 52 may be the photo sensor 53 or the image scanner 54. The print quality verifying level of them is variable. Therefore, a verifying level matching a value level of the value sheet 2A can be selected. A high precision verifying is not required for the value sheet 2A of a low value level. Therefore, a simple verifying process may be used for such a value sheet 2A. This leads to reduction of the value-sheet issuing time. Accordingly, selection of a verifying level mismatching the value level of the value sheet to be issued is avoided. This results in reduction of the issuing time and economical improvement.

The discharging portion 10 (FIG. 1) receives value sheets 2A from the print verifying section 8 and delivers them to the customer. The discharging portion 10 includes a sheet holder 58 for holding a preset number of value sheets issued, and a shutter 59 for the sheet holder 58. Where the customer wants to get a preset number of value sheets, the value-sheet issuing device 1 issues that number of value sheets sheet by sheet, and stacks them in the sheet holder 58. When the number of the issued value sheets reaches the desired number, the value-sheet issuing device 1 moves the shutter 59 to open and allows the customer to access to the stack of value sheets. Provision of the shutter 59 prevents dust, for example, from entering into the value-sheet issuing device 1.

The first collector box 11 is provided for collecting issued value sheets, which are returned by the customer while being not yet used. It is desirable to construct the first collector box 11 so as to receive only those value sheets that are issued by the issuing device per. If so done, the issuing device 1 can reject forged value sheets. Such a construction can readily be realized in the following manner. The device information 40 is printed on the value sheet at the time of its issuing. When collecting the value sheets that are not yet used, the issuing device 1 reads the device information, and judges whether or not the value sheet is issued by the issuing device per se. If the answer is no, the first collector box 11 rejects the value sheet. Even if the value-sheet issuing device 1 is stolen and a great number of forged value sheets are issued by use of the value-sheet issuing device 1, those forged value sheets are rejected by other value-sheet issuing devices.

A shutter 61 and a sensor (not shown) are provided at an opening 60 of the first collector box 11. The shutter 61 is movable to open and close. The sensor senses a value sheet being inserted into the first collector box 11, through the opening 60. When the sensor senses an insertion of the value sheet, the shutter 61 responsively moves to open and allows the value sheet to enter into the first collector box 11. The value-sheet issuing device reads the device information 40 attached to the value sheet 2A and checks whether or not it is acceptable. If it is acceptable, the issuing device attaches information (e.g., character) indicative of "acceptable" to the value sheet 2A, and sends it to the second collector box 12. If it is not acceptable, the issuing device returns it to the person who put it into the first collector box 11, through the opening 60.

The second collector box 12 collects defective value sheets 2A, for example, value sheets having undergone abnormality during its issuing operation, and the value sheets collected by the first collector box 11. When the result of reading the random attribute is abnormal in the security processing section 4, the magnetic recording is improper in the security processing section 4, a abnormal print is detected in the print verifying section 8, and the returned value sheet 2A is still left there after a preset time elapses after the shutter 59 is opened in the discharging portion 10, those defective value sheets are collected. In this case, it is preferable that after information (e.g., character) indicative of "collected value sheets" is attached to the defective ones, the defective value sheets are transported to the second collector box 12. The attachment of such information will prevent attempted fraudulent use of the value sheets.

The stacker portion 13 is stocked with value sheets 2A bearing common images 5 thereon. Those value sheets 2A are sorted every kind of the common image 5 in the stacker portion 13. The stacker portion 13 is located downstream of the print verifying section 8 but upstream of the security processing section 4. A sheet-like printing medium 2 supplied from the medium supplying section 3 is transported to the printer section 7 where a common image 5 is printed on the printing medium; the printed printing medium is transported to the print verifying section 8 where it is subjected to a verifying process; and is temporarily stored in the stacker portion 13. In the stage of issuing the printed printing medium in the form of a value sheet 2A, the printed printing medium is conveyed from the stacker portion 13 to the security processing section 4. The security processing section 4 assigns security characteristic to the printed printing medium, and the printer section 7 further prints individual information 6 to the printing medium coming from the security processing section 4. Since the printing medium is thus processed, there is no need of printing the common image 5 on the printing medium after the customer instructs the value-sheet issuing device to issue a value sheet or sheets. Therefore, the value-sheet issuing time is reduced. Generally, the common image 5 is a high-definition color image. Several tens seconds are taken for printing the high-definition color image. Since those common images 5 are printed in advance in an idle time of the issuing device, the value-sheet issuing time is reduced by the time for printing the common image 5.

In the embodiment, the stacker portion 13 includes a plurality of stackers as shown in FIG. 1. The printed printing media are sorted every kind of the printing media, and placed in those stackers, respectively. Each stacker may be stocked with about 20 number of printed printing media. When the printed printing media are delivered to the next stage, a counter located at a proper position counts those printing media, for example, in a count-down manner. With this, the number of printed printing media being left in the stacker portion 13 can be monitored. When the number of the printed printing media left is below a preset number, the value-sheet issuing device replenishes the stacker portion with printed printing media by printing common images 5 on the sheet-like printing media in an idle time of the issuing device, viz., when the issuing device does not engage in issuing value sheets.

In the value-sheet issuing device 1 shown in FIG. 1, the control unit 14, connected to the upper level device 9, controls the operations of the related sections and portions as shown in FIG. 20. The control unit 14 is made up of the CPU 45 as a central processing unit, the local memory 36 for storing common images 5, a memory 62, as storage means, including ROM and RAM, the print memory 37 for temporarily storing an image to be printed, the print driver 46 for driving the printer section 7, and an I/F driver 63 connected to the upper level device 9. The CPU 45 is connected to the medium supplying section 3, the security processing section 4, the print verifying section 8, the discharging portion 10, the first collector box 11 and the second collector box 12.

The operations of the thus constructed value-sheet issuing device 1 will be described with reference to flow charts shown in FIGS. 21 to 25. It should be understood that the flow charts are illustrated by way of example, and selected operations will give rise to other flow charts.

Figure 21:
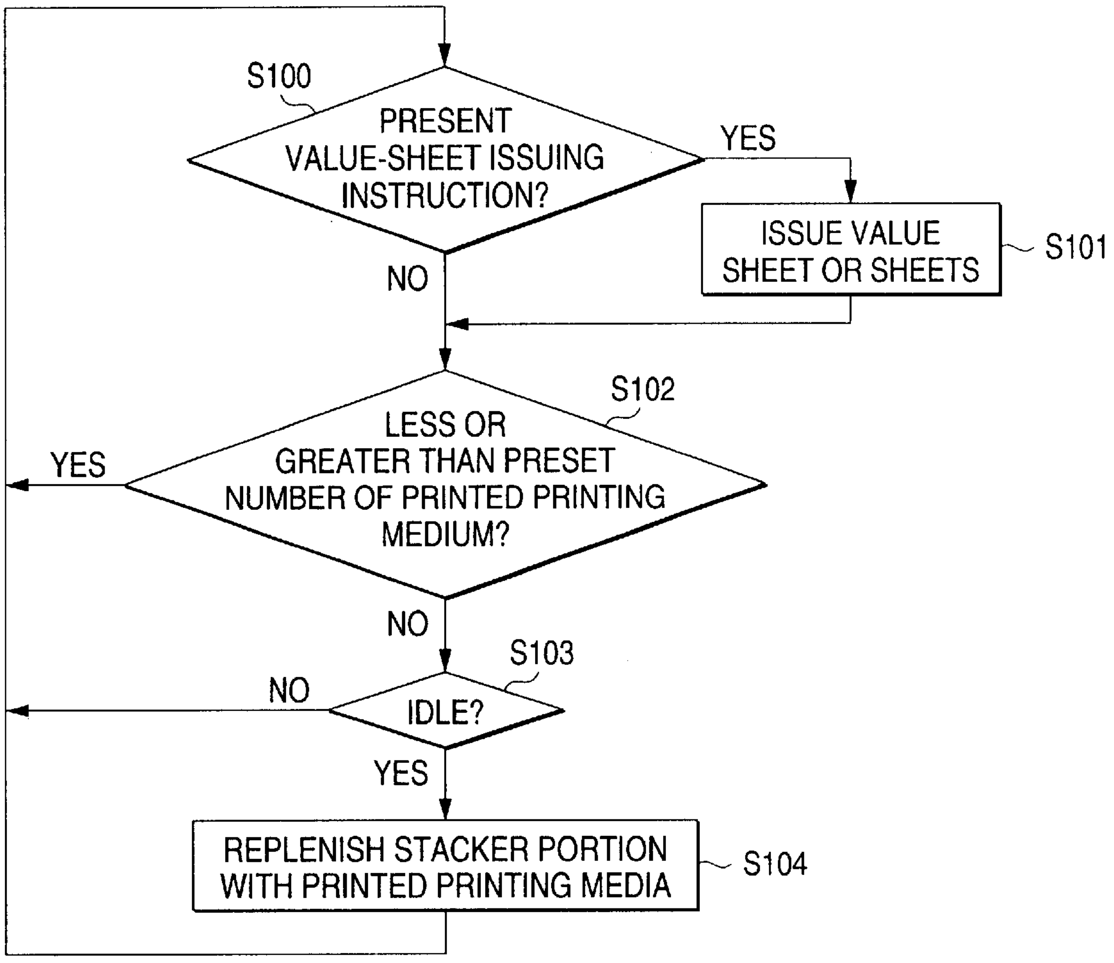
FIG. 21 is a flow chart showing a main process of a value-sheet issuing process used in the value-sheet issuing device.

As shown in FIG. 21, the value-sheet issuing device 1, placed in a stand-by mode, judges whether or not there is present a value-sheet issuing instruction from the upper level device 9, which is issued in response to an instruction by a customer (step S100). If the sheet issuing instruction is present (YES, S100), the value-sheet issuing device 1, more precisely the CPU 45, issues a value sheet or sheets 2A (step S101). The value sheet issuing process is charted in FIGS. 22 and 23. If it is not present (NO, S100), the CPU 45 (referred to as a controller) judges whether or not a preset number of printed printing media 2 are stacked in each stacker of the stacker portion 13 (step S102).

If the answer is YES, the controller returns to the step S100. If the number of printed printing media 2 is below the present number (NO, S102), the controller checks if the value-sheet issuing device 1 is idle (step S103). If it is idle (YES, S103), the controller carries out a process for replenishing the stacker portion 13 with printed printing media 2 (step S104). The replenishing process is charted in FIGS. 24 and 25. If it is not idle (NO, S103), the controller returns to the step S100 (to check if the value-sheet issuing instruction is present).

Figure 22:
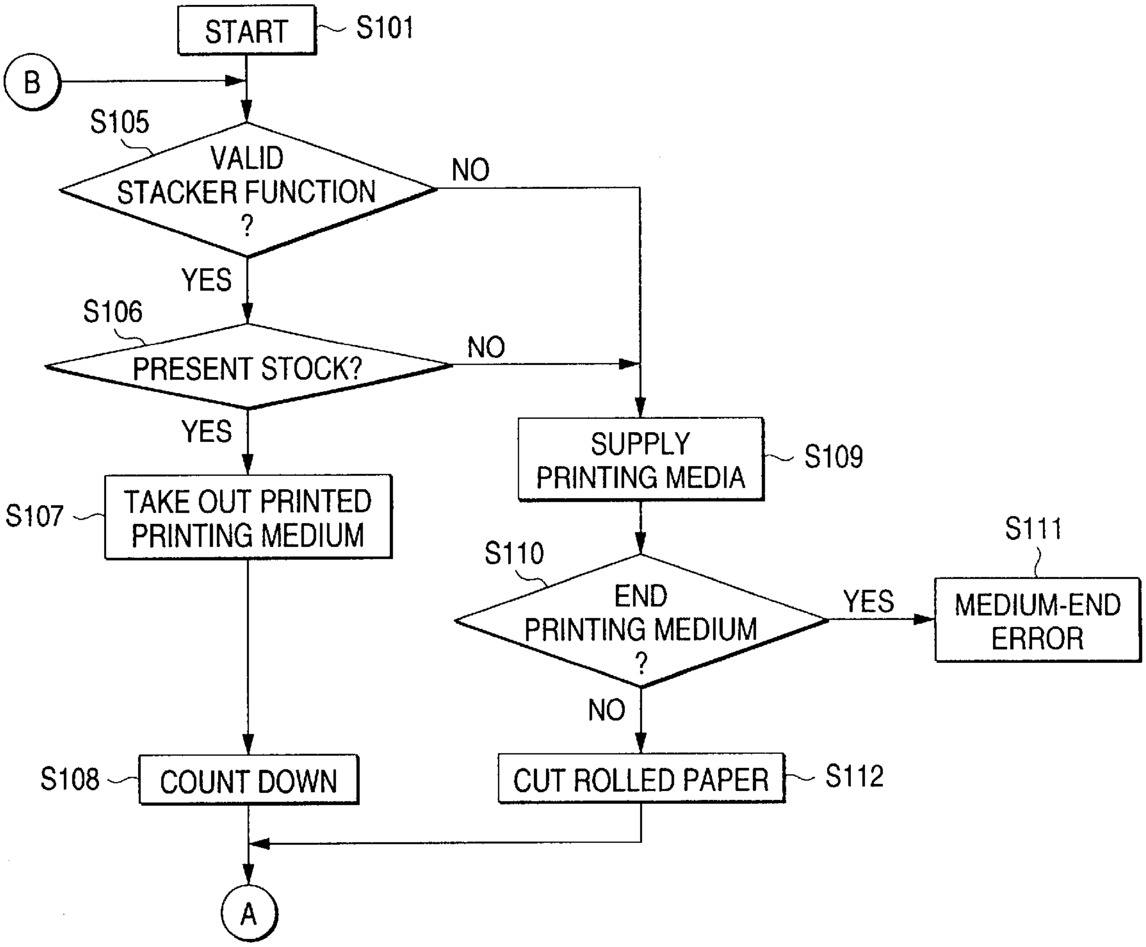
FIG. 22 is a flow chart showing a process for issuing value sheets.

Reference is made to FIGS. 22 and 123. As shown, in the value-sheet issuing process (S101), the controller judges if the function of the stacker portion 13 is valid (S105). For the judgement, the controller checks as to whether or not the value-sheet issuing device 1 is equipped with the stacker portion 13, 2) use of the stacker portion 13 is permitted if it is equipped, and 3) a value sheet to be issued belongs to any of the kinds of printed printing media contained in the stacker portion 13. If the controller judges that a value sheet or sheets, which belongs in its kind to the printed printing media 2 in one of the stackers of the stacker portion 13 (YES, S105), the controller checks if a stock of such printed printing media 2 is present in the related stacker (step S106). If it is present (YES, S106), the controller takes it out of the stacker (S107), and drives the counter to count down (S108).

The controller drives the medium supplying section 3 (S109) to supply printing media 2 1) when the value-sheet issuing device 1 is not equipped with the stacker portion 13, 2) when a value sheet to be issued is not contained in the stacker portion 13 (NO, S105), 3) when the printed printing media 2 are not present in the stacker portion 13 (NO. S106). If the printing medium ends (YES, S110), the controller indicates an error and stops the processing (S111). If the printing medium is present (NO, S110), a roll paper 15 is cut to a given length and feeds a printing medium or paper (S112).

A printing medium supplied from the stacker portion 13 or the medium supplying section 3 is transferred to the security processing section 4. The security processing section assigns security characteristic to the printing medium. In an exemplar flow chart shown in FIG. 23, the controller reads random attribute attached or recorded in the printing medium 2 (S113), magnetically records the read random attribute into the printing medium 2, and detects the result of recording (S114). The security characteristic is selectively used, and it is not limited to the illustrated one, as a matter of course. The printer section 7 prints on the printing medium 2 (S115). When the printing medium 2 is supplied from the stacker portion 13, the printer section 7 prints individual information 6 and device information 40 on the printing medium 2. When it is supplied from the medium supplying section 3, the printer section 7 prints a common image 5 in addition to the individual information 6 and the device information 40. The print verifying section 8 if the print quality is good (S116). If it is good (OK, S116), the printed printing medium 2 is transported to the discharging portion 10 (S117), and the controller judges if the number of printed printing media 2 reaches a designated number of value sheets (S118). If it is smaller than the designated one (NO, S118), the controller returns to the step S105 (FIG. 22) to check if the function of the stacker portion 13 is valid.

If an abnormality is detected (NG) in the step S113 (random attribute reading), the step S114 (magnetic recording), or the step S116 (print quality verifying), the printed printing medium 2 is transported to the second collector box 12 for discarding it (S119). The controller retries to carry out the above operation (S120). If it retries (YES, S120), the controller returns to the step S118 to check if the number of printed printing media 2 reaches a designated number of value sheets. If not retry (NO, S120), the controller presents an error indication and steps the processing (S121).

If the number of issued value sheets reaches the designated number (YES, S118), the shutter 59 of the discharging portion 10 is opened and a bundle of designated number of value sheets is discharged to the customer (S122). The controller judges if the value-sheet bundle is taken out (S123). If the value sheets are left there after a predetermined time elapses (YES, S123), the value sheets are transported to the second collector box 12 (S124). If the value sheets are taken out (NO, S123), the controller ends the issuing operation of the value sheets 2A.

Figure 24:
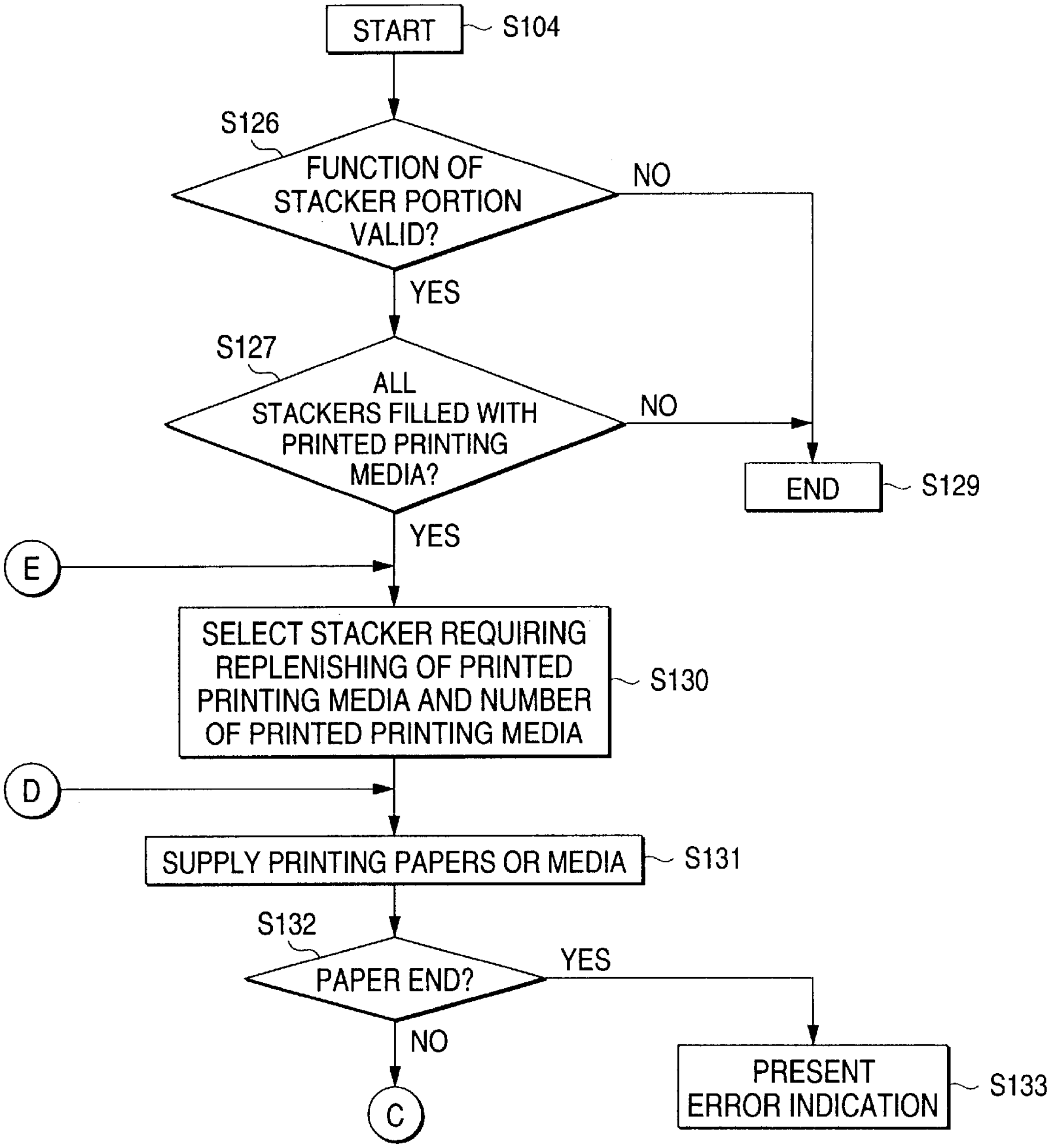
FIG. 24 is a flow chart showing a process for replenishing a stacker portion with printed printing media.
Figure 25:
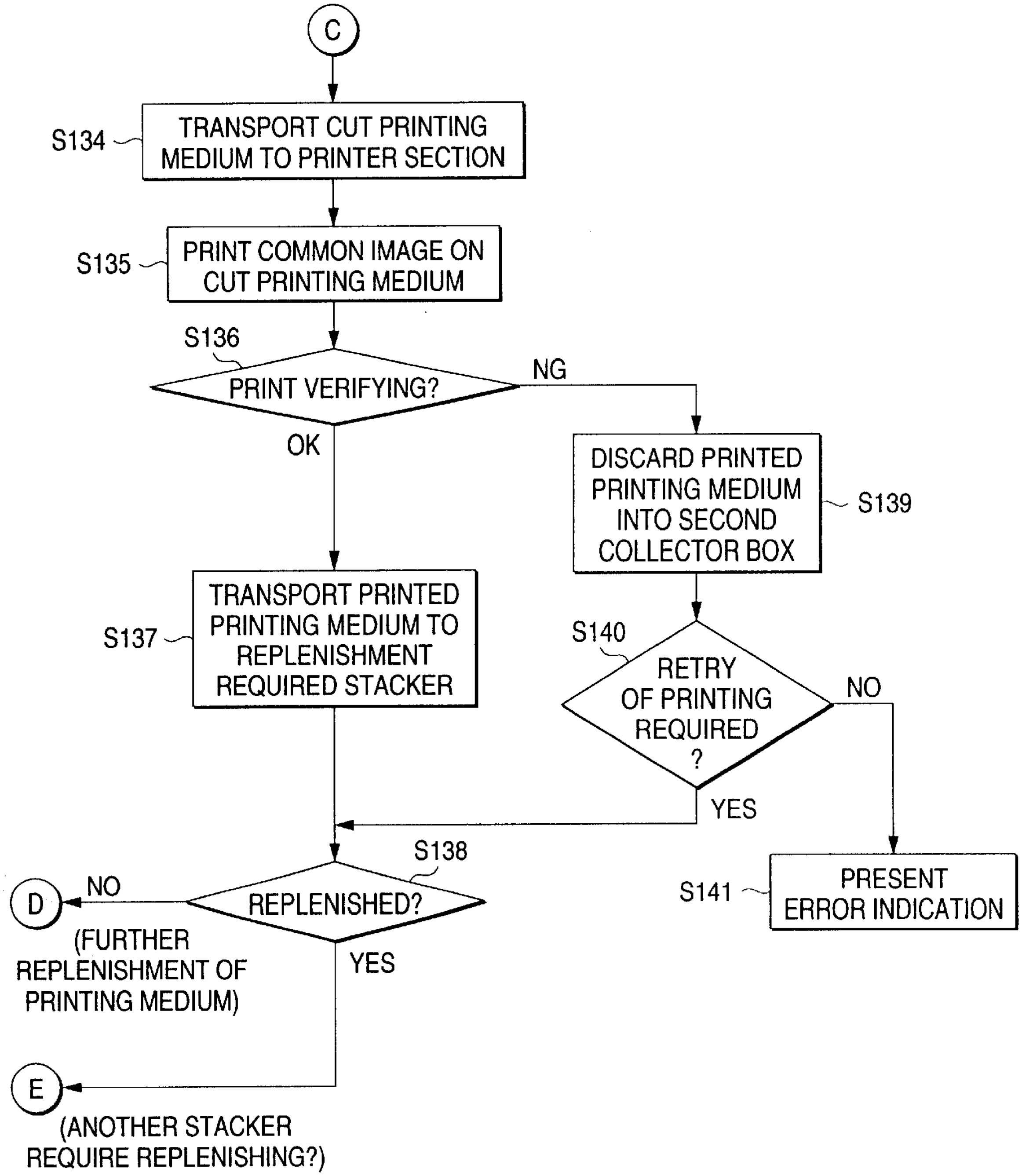
FIG. 25 is a flow chart continued from the FIG. 24 flow chart.

Reference is made to FIGS. 24 and 25 showing the process for replenishing the stacker portion 13 printed printing media 2 (step S104). In this process, the controller judges if the function of the stacker portion 13 is valid (S126). Specifically, the controller checks 1) if the value-sheet issuing device 1 is equipped with the stacker portion 13 and 2) use of the stacker portion 13 is permitted if it is equipped. The controller checks if printed printing media 2 are present in all the valid stackers, viz., if a stacker or stackers containing an insufficient number of printed printing media 2 is present (S127). If it is not equipped or prohibited from using the stacker portion 13 (NO, S126), and if all the stackers of the stacker portion 13 are filled with the printed printing media 2 (NO, S127), the controller ends the replenishing process (S129).

If a stacker contains an insufficient number of printed printing media 2 (YES, S127), the controller selects the stacker requiring the replenishing of printed printing media 2 and the number of printed printing media 2 (S130). The controller drives the medium supplying section 3 to supply the necessary number of printed printing media or paper 2 (S131). If the paper (roll paper 15) ends (YES, S132), the controller presents an error indication since it cannot issue value sheets, and stops the processing (S133). If the roll paper is left, the controller drives the cutter to cut the paper to a predetermined length, and the cut papers are supplied as printing media 2. The cut printing medium 2 is transported to the printer section 7 (S134), and the printer section prints a common image 5 on the cut printing medium 2 (S135). The printed common image 5 is processed for its verification by the print verifying section 8 (S136). If it is good (OK, S136), the printed printing medium 2 is transported to the stacker portion 13 (S137), and the controller drives the counter to count up and checks if the necessary number of printed printing media 2 are supplied (S138). If the necessary number of printed printing media 2 are supplied (NO, S138), the controller returns to the step S131 to supply the printed printing media 2. If those are supplied (YES, S138), the stacker is now contains a sufficient number of printed printing media 2, and then the controller judges if there is another stacker containing an insufficient number of printed printing media 2. If such a stacker is present, the controller returns to the step S130 to select the stacker requiring the replenishing of printed printing media 2 and the number of printed printing media 2. Through those operations, all the stackers of the stacker portion 13 are stocked with the sufficient numbers of printed printing media 2, and then the controller ends the replenishing process.

If the answer of the print verifying section 8 is no good (NG, S136), the printed printing medium 2 is discarded into the second collector box 12 (S139). At this time, the controller judges if a retry of printing is required (S140). If the retry is required (YES, S140), the controller judges if the number of printed printing media reaches a predetermined number of printed printing media (S138). If the retry is not required (NO, S140), the controller presents an error indication and stops the replenishing process (S141).

As described above, the value-sheet issuing device 1 stores common images 5 in the local memory 36 before the printed printing media 2 are issued, and when their issuance is required, reads a required common image 5 out of the local memory 36 and prints incoming printing media 2. Therefore, there is no need of receiving the common image 5 from the upper level device 9 every time the value sheet is issued. This leads to reduction of data transfer time.

In the printer section 7, two IJP printheads 48 are concurrently moved for printing, so that the resultant printing speed is higher than that in the printing method using a single printhead. Reduction of the time for issuing the value sheet 2A results. Use of printing time substantially equal to that by the single printhead will produce high print quality since printing is doubly performed.

The attribute detector 25 and the security applying means 26 may selectively be operated in the security processing section 4. With this feature, a security level of the complexity of the security characteristic may be changed in accordance with a value level of the value of money assigned to the value sheet. Accordingly, a security level of the security characteristic is selected so as to match a value level of a value sheet to be issued, and such a security characteristic is assigned to the printed printing medium 2. Therefore, a value-sheet issuing time of the value-sheet issuing device is reduced, and the issuing device may be economically operated.

A print level of the printer section 7 may be selected in the upper level device 9. Therefore, a print level may be changed in accordance with a value level of a value sheet 2A to be issued. Therefore, a print level matching a value level of a value sheet 2A may be selected, and printing of the printed printing medium 2 may be performed at such a print level. Therefore, a value-sheet issuing time of the value-sheet issuing device is reduced, and the issuing device may be economically operated.

The print verifying section 8 is arranged so as to select one of the plural verifying means 52. Therefore, a verification level of the print verifying section 8 may be changed in accordance with a value level of the value sheet 2A. Therefore, a verification level matching a value level of a value sheet 2A may be selected. Therefore, a value-sheet issuing time of the value-sheet issuing device is reduced, and the issuing device may be economically operated.

It should be understood that the above-mentioned embodiment is only one of modes of implementing the invention, and the invention is not limited to such. It is evident that the present invention is not limited to the specific embodiment mentioned above, but may variously be modified, altered and changed within the true spirits and scope of the invention. The embodiment is arranged such that only the common image 5 is printed on the printing medium. If required, something representing security characteristic may be attached to or recorded in the printing medium, in addition to the common image 5. Also in this case, the value-sheet issuing time is reduced by the time for printing the common image 5 and others.

The stacker portion 13 is located downstream of the print verifying section 8 but upstream of the security processing section 4. If required, it may be located between the printer section 7 and the security processing section 4, and downstream of the print verifying section 8. In this case, it is preferable to attach security characteristic to the printing medium before it is loaded into the stacker portion.

The value-sheet issuing device 1 is equipped with the stacker portion 13 stocked with the printing media 2 bearing common images 5 printed thereon, in the above-mentioned embodiment. The stacker portion 13 is not essential, however. The value-sheet issuing device 1 not equipped with the stacker portion 13 is reduced in device size.

Two or more number of IJP printheads 48 may be used for the printer section 7, although two IJP printheads 48 are used in the embodiment. The IJP printheads 48 may be replaced with a color laser printer or a thermal transfer printer. Use of the color laser printer will increase printing speed and improve the print quality. Use of the thermal transfer printer will improve the print quality. Use of a monochromatic printer is allowed. In either case, it is possible that when value sheets 2A are issued, the common image 5 is read out of the local memory 36 and is printed on the printing medium. Reduction of data transfer time and value-sheet issuing time is realized. The value-sheet issuing device, which is assembled into the self-service terminal, may be assembled to any other suitable printing system or device.

As seen from the foregoing description, a value-sheet issuing device constructed according to the present invention stores common images in a local memory before a printed printing media is issued, and when its issuance is required, reads a required common image out of the local memory and prints an incoming printing media. Therefore, there is no need of receiving the common image from the upper level device every time the value sheet is issued. This leads to reduction of data transfer time.

Figure 23:
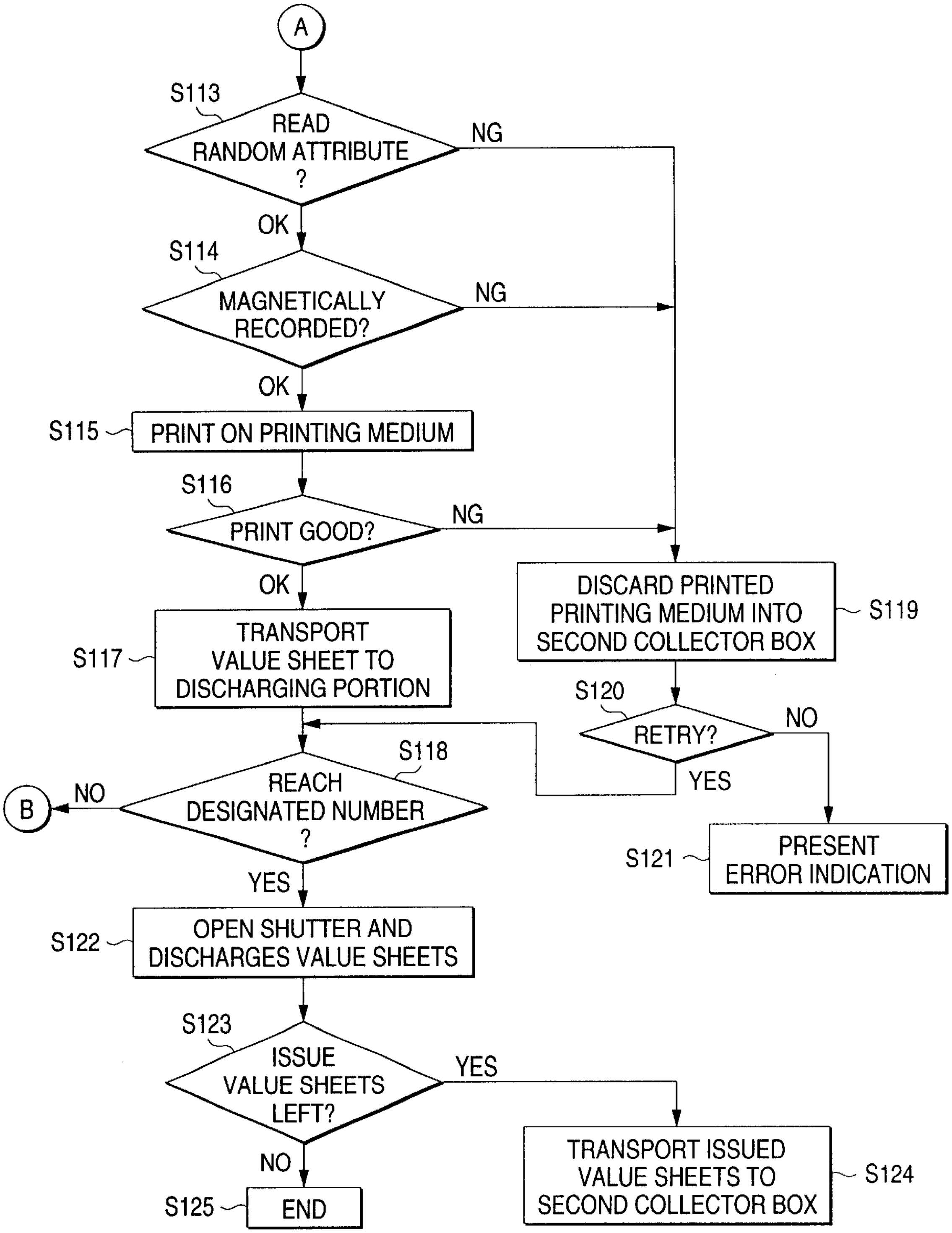
FIG. 23 is a flow chart continued from the FIG. 22 flow chart.

<FIG. 21>
S100 present value-sheet issuing instruction?
S101 issues a value sheet or sheets
S102 less or greater than a preset number of printed printing medium?
S103 idle?
S104 replenish the stacker portion with printed printing media
<FIG. 22>
S101 start
S105 valid stacker function?
S106 present stock?
S107 takes out a printed printing medium
S108 count down
S109 supplies printing media
S110 end printing medium?
S111 medium-end error
S112 cut the rolled paper
<FIG. 23>
S113 read random attribute
S114 magnetically recorded?
S115 prints on the printing medium
S116 print good?
S117 transport the value sheet to the discharging portion
S118 reach a designated number?
S119 discard the printed printing medium into the second collector box
S120 retry?
S121 presents an error indication
S122 opens the shutter and discharges value sheets
S123 issued value sheets left?
S124 transports the issued value sheets to the second collector box
S125 end
<FIG. 24>
S126 function of the stacker portion valid?
S127 all the stackers filled with printed printing media?
S129 ends
S130 selects the stacker requiring the replenishing of printed printing media and the number of printed printing media
S131 Supply printing papers or media
S132 paper end?
S133 present an error indication
<FIG. 25>
S134 transport the cut printing medium to the printer section
S135 print a common image on the cut printing medium
S136 print verifying
S137 transport the printed printing medium to the replenishment required stacker
S138 replenished?
S139 discard the printed printing medium into the second collector box
S140 retry of printing required?
S141 presents an error indication
D (further replenishment of the printing medium)
E (another stacker require the replenishing?)

What is claimed is:

1. A value-sheet issuing device comprising:

a medium supplying section for holding a sheet-like printing medium and supplying said printing medium to a stage for issuing a value sheet;

a control unit for issuing an instruction to said medium supplying section to supply said printing medium;

an upper level device for issuing a print command to said control unit and for assigning individual information for said printing medium;

a security processing section for selectively assigning a security characteristic, for preventing attempted fraudulent use of said value sheets, to said printing medium received from said medium supplying section in response to an instruction received from said upper level device;

local storage for storing common images used common to each issued value sheets;

a printer section for printing said common image read out of said local storage means and/or individual information received from said upper level device, said individual information being different for each said issued value sheet; and a print verifying section for verifying a print quality of said printed printing medium, wherein said control unit judges whether or not the individual information assigned from said upper level device is already stored in the local storage, and, if said individual information is stored in said local storage, said control unit instructs said printer section to print said individual information from said local storage without reading said information from said upper level device to facilitate a reduction in data transfer time.

2. A value-sheet issuing device according to claim 1, wherein said security processing section includes attribute detecting means for detecting attribute information for security, which is possessed by said printing medium, and security applying means for applying a new security characteristic to said printing medium, and said attribute detecting means and said security applying means are selectively used.

3. A value-sheet issuing device according to claim 2, wherein said attribute detecting means have a sensor for detecting random information of said printing medium in the form of random attribute, and said random attribute detected by said sensor is stored into said printing medium, in the form of data.

4. A value-sheet issuing device according to claim 1, wherein said common image is different for each kind of said printing medium and said individual information is different for each said printing medium.

5. A value-sheet issuing device according to claim 4, wherein said local storage means stores said common images of different kinds, said issuing device judges whether or not a common image to be printed is contained in said local storage means, and if said common data is contained, said issuing device reads said common image from said local storage means and causes said printer section to print said read out common image on said printing medium.

6. A value-sheet issuing device according to claim 5, wherein a print level of said printer section is selected in said upper level device.

7. A value-sheet issuing device according to claim 6, wherein said print level of said printer section is changed by one of changing a print resolution at which the printing of said printing medium is carried out, limiting a location on said printing medium at which said common image is to be printed to a specific location, and changing the size of said printing medium.

8. A value-sheet issuing device according to claim 6, wherein said printer section includes a plurality of printheads, and in printing, said printheads are moved in a state that printheads are located at different positions.

9. A value-sheet issuing device according to claim 4, wherein said print verifying section includes a plurality of verifying means having different verifying levels, and said plurality of verifying means are selectively operated depending on the value of the value issued sheets so that a simple verifying process is used for a low value issued sheet, while a more extensive verifying process is sued for a high value issued sheet.

10. A value-sheet issuing device according to claim 9, wherein said verifying means verifies a printed printing medium of a low value of money at a low verifying level.

11. A value-sheet issuing device according to claim 1, further comprising a stacker portion for storing a stock of said printing media bearing said common images printed thereon, and to issue value sheets, said printed printing media are taken out of said stacker portion and said individual information is printed on said printed printing media.

12. A value-sheet issuing device according to claim 11, wherein said printer section prints said common images on said printing media supplied from said medium supplying section, and said print verifying section verifies print quality of said common images printed on said printing media, and said printed printing media are stored into said stacker portion.

13. A value-sheet issuing device according to claim 11, wherein said stacker portion includes a plurality of stackers, and different kinds of said printed printing media bearing different images printed thereon are placed in said plurality of stackers, respectively.

14. A value-sheet issuing device according to claim 1, further comprising:

a discharging portion for receiving said printed printing media from said print verifying section and discharging them outside;

a first collector box for receiving issued value sheets not yet used from outside; and a second collector box for receiving defective value sheets and value sheets collected by said first collector box.

15. A value-sheet issuing device comprising:

a medium supplying section for holding a sheet-like printing medium and supplying said printing medium to a stage for issuing a value sheet;

a security processing section for selectively assigning security characteristic for preventing attempted fraudulent use of said value sheets to said printing medium received from said medium supplying section in response to an instruction received from an upper level device;

local storage for storing common images used common to issued value sheets;

a printer section for printing said common image read out of said local storage means and/or individual information received from said upper level device, said individual information being different for each said issued value sheet;

a print verifying section for verifying a print quality of said printed printing medium; and a stacker portion for storing a stock of said printing media bearing said common images printed thereon, and to issue value sheets, said printed printing media are taken out of said stacker portion and said individual information is printed on said printed printing media, wherein said printer section prints said common images on said printing media supplied from said medium supplying section, and said print verifying section verifies print quality of said common images printed on said printing media, and said printed printing media are stored into said stacker portion, wherein said stacker portion includes a counter for monitoring a number of said printed printing media in said stacker portion, and if the number of said printed printing media is smaller than a predetermined number of said printed printing media, a necessary number of said printed printing media is prepared when said value-sheet issuing device is idle, and said stacker portion is replenished with said prepared printed printing media.

* * * * *